US009563173B2

(12) United States Patent
Kim et al.

(10) Patent No.: US 9,563,173 B2
(45) Date of Patent: Feb. 7, 2017

(54) MOBILE TERMINAL AND SYSTEM FOR CONTROLLING HOLOGRAPHY PROVIDED THEREWITH

(71) Applicant: LG ELECTRONICS INC., Seoul (KR)

(72) Inventors: Jonghwan Kim, Incheon (KR); Jongsuk Won, Yangju-Si (KR); Iwon Choi, Seoul (KR); Daeeop Yun, Gwangju (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 14/368,879

(22) PCT Filed: Sep. 21, 2012

(86) PCT No.: PCT/KR2012/007611
§ 371 (c)(1),
(2) Date: Jun. 26, 2014

(87) PCT Pub. No.: WO2013/100323
PCT Pub. Date: Jul. 4, 2013

(65) Prior Publication Data
US 2015/0116454 A1    Apr. 30, 2015

(30) Foreign Application Priority Data

Dec. 27, 2011  (KR) ........................ 10-2011-0143677
Dec. 28, 2011  (KR) ........................ 10-2011-0145082

(51) Int. Cl.
*H04N 5/89*   (2006.01)
*G03H 1/04*   (2006.01)
(Continued)

(52) U.S. Cl.
CPC .............. *G03H 1/0486* (2013.01); *G03H 1/08* (2013.01); *G03H 1/2294* (2013.01);
(Continued)

(58) Field of Classification Search
CPC ... G03H 1/0011; H04N 9/3173; H04N 9/3176
See application file for complete search history.

(56) References Cited

U.S. PATENT DOCUMENTS 5,325,195 A      6/1994   Ellis et al.
6,973,263 B2 *  12/2005   Nakamura ............... G02B 5/32
                                                 348/E5.045
(Continued)

FOREIGN PATENT DOCUMENTS

JP     2009-134147 A       5/2011
KR  10-2006-0019211 A      3/2006
(Continued)

OTHER PUBLICATIONS

"Trou—Hologram Projecting Flexible Mobile Phone Concept," available at http://petitinvention.wordpress.com/2009/06/10/trou/ (last visited Apr. 14, 2011) (11 pages).*

*Primary Examiner* — Christopher Findley
(74) *Attorney, Agent, or Firm* — Birch, Stewart, Kolasch & Birch, LLP

(57) ABSTRACT

The present disclosure provides a mobile terminal comprising: a main body of the terminal; a holography module attached to the main body of the terminal and positioned so as to output a holographic image into a preset space; and a first camera module arranged in the direction of the preset space so as to film the holographic image. Also, the present invention provides a system for controlling holography comprising the mobile terminal and a target apparatus. The target apparatus is configured so as to film the holographic image by communicating with the mobile terminal or to
(Continued)

analyze the holographic image and generate an operational command corresponding thereto.

18 Claims, 22 Drawing Sheets

(51) Int. Cl.
  G03H 1/08       (2006.01)
  G03H 1/22       (2006.01)
  H04N 5/225      (2006.01)
  H04N 5/232      (2006.01)

(52) U.S. Cl.
  CPC ....... *H04N 5/2257* (2013.01); *H04N 5/23216* (2013.01); *H04N 5/23293* (2013.01); *G03H 2001/0491* (2013.01); *G03H 2210/42* (2013.01); *G03H 2227/02* (2013.01)

(56) References Cited

U.S. PATENT DOCUMENTS

| | | | |
|---|---|---|---|
| 8,958,201 B2* | 2/2015 | Leung | G06F 1/1626 361/679.27 |
| 2003/0114200 A1* | 6/2003 | Lee | G02B 27/0103 455/566 |
| 2003/0155495 A1* | 8/2003 | Drinkwater | G02B 5/1842 250/237 R |
| 2009/0102603 A1* | 4/2009 | Fein | G03H 1/0005 340/5.81 |
| 2009/0157538 A1* | 6/2009 | Subramaniam | G06Q 10/10 705/35 |
| 2010/0201836 A1 | 8/2010 | Kim et al. | |
| 2011/0248665 A1* | 10/2011 | Smith | G03H 1/2294 320/101 |

FOREIGN PATENT DOCUMENTS

| KR | 10-2006-0062116 A | 6/2006 |
|---|---|---|
| KR | 10-2010-0091286 A | 8/2010 |
| KR | 10-2011-0045686 A | 5/2011 |

* cited by examiner

MOBILE TERMINAL AND SYSTEM FOR CONTROLLING HOLOGRAPHY PROVIDED THEREWITH

TECHNICAL FIELD

The present disclosure relates to a mobile terminal having a holography module, and a holography control system using a holographic image.

BACKGROUND ART

Mobile terminals are electronic devices which are portable and have at least one of voice and telephone call functions, information input and/or output functions, a data storage function and the like.

As it becomes multifunctional, the mobile terminal can be allowed to capture still images or moving images, play music or video files, play games, receive broadcast and the like, so as to be implemented as an integrated multimedia player.

Many efforts are undergoing to support and enhance various functions as such multimedia player in view of hardware or software improvements. As one example, a user interface environment is provided in order for users to easily and conveniently perform a voice (audio) recording or retrieve or select a voice (audio) file.

In addition to those efforts, a method for more improving functions of a mobile terminal may be taken into account. The improvement method may include structural changes and improvements for more facilitating a user to use the mobile terminal. As one of the structural changes and improvements, a mobile terminal having a holography module and a holography control system using a holographic image may be considered.

SUMMARY OF THE INVENTION

Therefore, an aspect of the detailed description is to provide a mobile terminal having more various user interfaces in association with holography.

Another aspect of the detailed description is to provide a holography control system using a holographic image.

To achieve these and other advantages and in accordance with the purpose of the present invention, as embodied and broadly described herein, there is provided a mobile terminal including a terminal body, a holography module mounted to the terminal body and configured to output a holographic image to a preset space, and a first camera module disposed to face the preset space and configured to capture the holographic image.

In accordance with one exemplary embodiment disclosed herein, the first camera module may focus on the preset space.

In accordance with another exemplary embodiment disclosed herein, the holography module may include a holographic storage unit configured to record interference fringes generated due to light interference, and a holographic output unit configured to irradiate light to the holographic storage unit such that the holographic image generated in response to light diffraction with the interference fringes is output to the preset space.

The mobile terminal may further include a controller configured to analyze the holographic image captured by the first camera module and adjust settings of the holographic output unit.

In accordance with another exemplary embodiment disclosed herein, the mobile terminal may further include a second camera module spaced apart from the first camera module by a preset distance and disposed to face the preset space, to capture the holographic image in a three-dimensional form together with the first camera module.

In accordance with another exemplary embodiment disclosed herein, the mobile terminal may further include a third camera module mounted to the terminal body, and configured to capture a portion except for the preset space when the first camera module captures the holographic image. The mobile terminal may further include a display module mounted to the terminal body and configured to output an image captured by the first camera module and an image captured by the third camera module in a dividing manner.

In accordance with another exemplary embodiment disclosed herein, the mobile terminal may further include a flash disposed to face the preset space to illuminate the holographic image.

In accordance with another exemplary embodiment disclosed herein, the mobile terminal may further include a flexible unit configured to form at least one area of the terminal body and be elastically deformable. Here, the holography module may output the holographic image to the preset space when the flexible unit is elastically deformed.

The holography module may include a holographic storage unit configured to record interference fringes generated due to light interference, a holographic output unit configured to irradiate light to the holographic storage unit to be diffracted with the interference fringes, so as to generate the holographic image, and a holographic reflection unit configured to turn an output direction of the holographic image such that the holographic image is output to the preset space.

The flexible unit may be elastically deformable such that the holographic output unit faces the holographic reflection unit.

Also, the mobile terminal may further include a controller configured to analyze an error due to the elastic deformation of the flexible unit or a change of an external environment, and adjust settings of the holographic output unit.

The terminal body may be configured to form a loop in a manner that the flexible unit is elastically deformed, and the holography module may output the holographic image to an inner space formed by the loop.

The holographic reflection unit may be disposed to cover one of openings, formed by the loop, such that the holographic image is reflected to be exposed through the other opening.

The mobile terminal may further include a first sensing unit mounted to one end portion of the terminal body, and a second sensing unit mounted to the other end portion of the terminal body and configured to sense the first sensing unit when the terminal body forms the loop. The holography module may output the holographic image when the second sensing unit senses the first sensing unit. Also, the holographic reflection unit may be disposed to cover the one opening when the second sensing unit senses the first sensing unit.

The flexible unit may be configured to be unrolled to the outside of the terminal body, and the holography module may output the holographic image when the flexible unit is unrolled by more than a preset area.

To achieve these and other advantages and in accordance with the purpose of the present invention, as embodied and broadly described herein, there is provided a holography control system including, a mobile terminal having a holography module formed to output a holographic image to a preset space, and configured to transmit a packet including position information related to a terminal body and attribute information related to the holographic image, and a target apparatus configured to execute communication with the mobile terminal. Here, the target apparatus may include a wireless communication unit configured to receive the packet, and a capturing unit configured to capture the holographic image using the received packet.

In accordance with one exemplary embodiment disclosed herein, the capturing unit may be configured to focus on the preset space.

In accordance with one exemplary embodiment disclosed herein, the capturing unit may be moved to face the preset space using the packet.

In accordance with another exemplary embodiment disclosed herein, the wireless communication unit may transmit the holographic image captured by the capturing unit to a server.

In accordance with another exemplary embodiment disclosed herein, the wireless communication unit may transmit relative position information with the mobile terminal obtained based on the received packet, to the mobile terminal. The holography module may adjust a protection direction of the holographic image based on the relative position information.

In accordance with another exemplary embodiment disclosed herein, the mobile terminal may further include a flash disposed to face the preset space to illuminate the holographic image.

In accordance with another exemplary embodiment disclosed herein, the target apparatus may further include a controller configured to analyze the holographic image captured by the capturing unit and generate a corresponding operation command.

To achieve these and other advantages and in accordance with the purpose of the present invention, as embodied and broadly described herein, there is provided a holography control system including, a mobile terminal having a holography module to output a holographic image to a preset space, and a target apparatus controlled by the holographic image.

In accordance with one exemplary embodiment disclosed herein, the target apparatus may include a sensing unit configured to sense the holographic image, and a controller configured to analyze the holographic image sensed by the sensing unit to generate a corresponding operation command.

The holographic image may include three-dimensional information implemented into a three-dimensional image, and the controller may execute an authentication for the operation command using the three-dimensional information sensed by the sensing unit.

In accordance with the detailed description, according to the present disclosure having the configurations, first to third camera modules may be disposed to face a preset space so as to capture a holographic image. This may allow the mobile terminal to implement more various user interfaces using the captured holographic image.

Also, a holographic module may output a holographic image to a preset space when a flexible unit forming at least one area of a terminal body is elastically deformed. This may allow for implementing more various user interfaces using the flexible unit, the holography module and the holographic image.

A target apparatus may capture a holographic image using a packet, which includes position information related to a terminal body and attribute information related to the holographic image, received from a mobile terminal.

In addition, a target apparatus may sense and analyze a holographic image output from a mobile terminal and thus generate a corresponding operation command, such that the holographic image can be used as means for authentication, construction of ubiquitous environment and the like.

DETAILED DESCRIPTION OF THE EMBODIMENTS

Description will now be given in detail of a mobile terminal and a holography control system having the same according to the exemplary embodiments disclosed herein, with reference to the accompanying drawings.

For the sake of brief description with reference to the drawings, the same or equivalent components will be provided with the same or like reference numbers, and description thereof will not be repeated. A suffix "module" and "unit" used for constituent elements disclosed in the following description is merely intended for easy description of the specification, and the suffix itself does not give any special meaning or function.

Mobile terminals described herein may include cellular phones, smart phones, laptop computers, digital broadcasting terminals, personal digital assistants (PDAs), portable multimedia players (PMPs), navigators, and the like.

However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
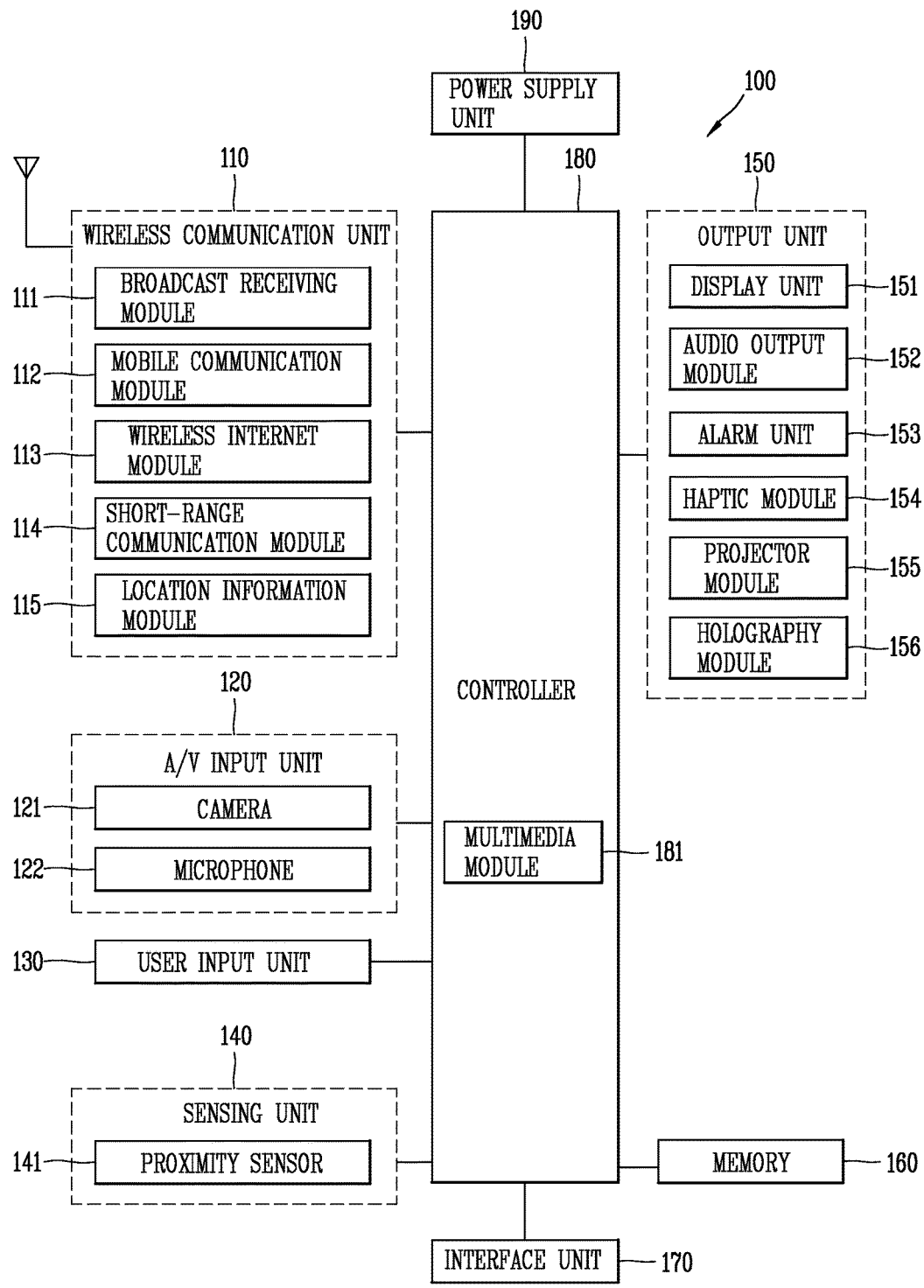
FIG. 1 is a block diagram of a mobile terminal in accordance with one exemplary embodiment of the present disclosure.

FIG. 1 is a block diagram illustrating a mobile terminal associated with an exemplary embodiment.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this exemplary embodiment, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, such as a GPS module.

Referring to FIG. 1, the A/V input unit 120 receives an audio or video signal, and the A/V input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, existence or non-existence of a user contact, an orientation of the mobile terminal 100 and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. Meanwhile, the sensing unit 140 may include a proximity sensor 141.

In addition, the sensing unit 140 may generate a sensing signal by measuring background noise (for example, 20 db) of the mobile terminal 100 or may be a light sensor that generates a sensing signal by measuring ambient brightness (for example, 20 lm) of the mobile terminal 100.

The output unit 150 is configured to provide an output for audio signal, video signal, or alarm signal, and the output unit 150 may include the display unit 151, an audio output module 152, an alarm unit 153, a haptic module 154, a projector module 155, a holography module 156, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of those displays may be configured with a transparent or optical transparent type to allow viewing of the exterior through the display unit, and such displays may be called transparent displays. An example of a typical transparent display may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

In embodiments where the display unit 151 and a touch sensitive sensor (referred to as a touch sensor) have an interlayer structure (hereinafter, referred to as a touch screen), the display unit 151 may be used as an input device in addition to being used as an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

A proximity sensor 141 may be arranged at an inner region of the portable terminal 100 covered by the touch screen, or near the touch screen. The proximity sensor may sense a presence or absence of an object approaching a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, a voice recognition mode, a broadcast reception mode, and the like. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include a call received, a message received, a key signal input, a touch input, and the like. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The projector module 155 is a component for executing an image projecting function using the mobile terminal 100. The projector module 155 may display an image, which is the same as or has at least part different from an image displayed on the display unit 151, on an external screen or a wall in response to a control signal.

In detail, the projector module 155 may include a light source (not illustrated) which emits light (for example, laser beams) for outputting an image to the outside, an image generator (not illustrated) which generates the image to output to the outside using the light emitted from the light source, and a lens (not illustrated) which externally outputting the image at a preset focusing distance in a magnifying manner. Also, the projector module 155 may include an apparatus (not illustrated) which adjusts an image projecting direction in a manner of mechanically moving the lens or the entire module.

The projector module 155 may be classified into a cathode ray tube (CRT) module, a liquid crystal display (LCD) module, a digital light processing (DLP) module, and the like according to a type of an element of display means. Specifically, the DLP module may operate to project an image, which is generated by reflecting light emitted from the light source to a digital micromirror device (DMD) chip, in a magnifying manner, and may be advantageous in reducing a size of the projector module 155.

Preferably, the projector module 155 may be disposed on a side, front or rear surface of the mobile terminal 100 in a lengthwise direction. Of course, the projector module 155 may also be disposed at any position of the mobile terminal 100, if necessary.

The holography module 156 may include a holography storage portion, a holography output portion, and, if necessary, a holography reflecting portion. The holography module 156 may output a holographic image on a preset space.

Hereinafter, a structure of the holography module 156 and a method of projecting a holographic image will be described in detail with reference to FIGS. 4 to 7.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may store information related to holographic interference fringes for supporting a holographic image projection of the holography module 156. That is, based on the information stored in the memory 160, a user voice, an application execution result and the like may output to the exterior through the holography module 156.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 may typically control the general operations of the mobile terminal 100. For example, the controller 180 may perform controlling and processing associated with voice calls, data communications, video calls, and the like. The controller 180 may include a multimedia module 181 for playbacking multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images, respectively.

The power supply unit 190 may receive external power or internal power and supply appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2:
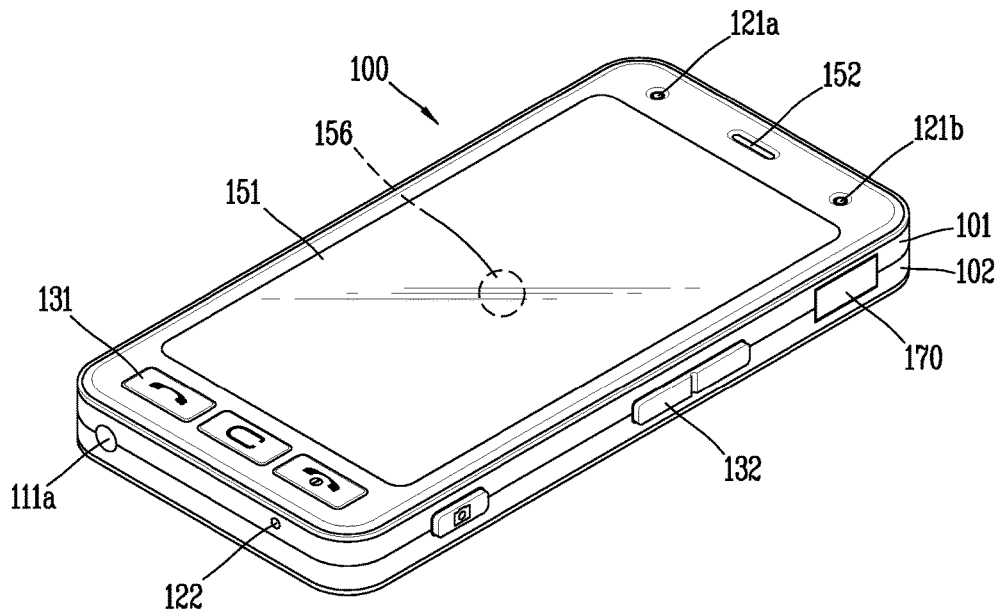
FIG. 2 is a front perspective view illustrating one exemplary embodiment of a mobile terminal according to the present disclosure.

FIG. 2 is a front perspective view illustrating one exemplary embodiment of a mobile terminal 100 according to the present disclosure.

The mobile terminal 100 shown in FIG. 2 has a bar type terminal body. However, this detailed description may be applicable, but not limited to, a watch type, a clip type, a glass type, or a various structures, such as a slide type, a folder type, a swing type, a swivel type and the like, having two or more bodies coupled to be relatively movable with each other.

The terminal body may include a case (or referred to as casing, housing, cover, etc.) defining an appearance of the mobile terminal 100. In this exemplary embodiment, the case may be divided into a front case 101 and a rear case 102. Various electronic components may be mounted in a space formed between the front case 101 and the rear case 102. At least one intermediate case may be disposed between the front case 101 and the rear case 102.

Such cases may be injected using a synthetic resin or be formed of a metal, such as stainless steel (STS), titanium (Ti), aluminum (Al) or the like.

The terminal body is shown having a display unit 151, an audio output module 152, first to third cameras 121a, 121b and 121c, a user input unit 130/131, 132, a microphone 122, an interface 170, and the like.

The display unit may occupy most of a principal surface of the front case 101. The audio output unit 152 and the first and second camera modules 121a and 121b may be disposed at an area adjacent to one of both end portions of the display unit 151, and the user input unit 131 and the microphone 122 may be disposed at an area adjacent to the other end portion. The user input unit 132, the interface 170 and the like may be disposed on side surfaces of the front case 101 and the rear case 102.

The user input unit 130 may be manipulated to allow inputting of commands for controlling operations of the mobile terminal 100, and include first and second manipulation units 131 and 132. The first and second manipulation units 131 and 132 may be referred to as a manipulating portion. Such manipulating portion can employ any tactile manner that a user can touch, push, scroll or the like for manipulation.

Contents input by the first and second manipulation units 131 and 132 may be set variously. For example, the first manipulation unit 131 may be configured to input commands such as menu, home, cancel, search or the like, and the second manipulation unit 132 may be configured to input commands, such as a volume adjustment of sounds output from the audio output module 152, conversion of the display unit 151 into a touch recognition mode, or the like.

The terminal body may be provided with the holography module 156. The holography module 156 may be configured to output a holographic image 156' (see FIG. 4A) on the front surface of the terminal body, for example, at a space on the display unit 151. The drawings exemplarily illustrate that the holography module 156 is disposed on one area of the display unit 151.

Figure 3:
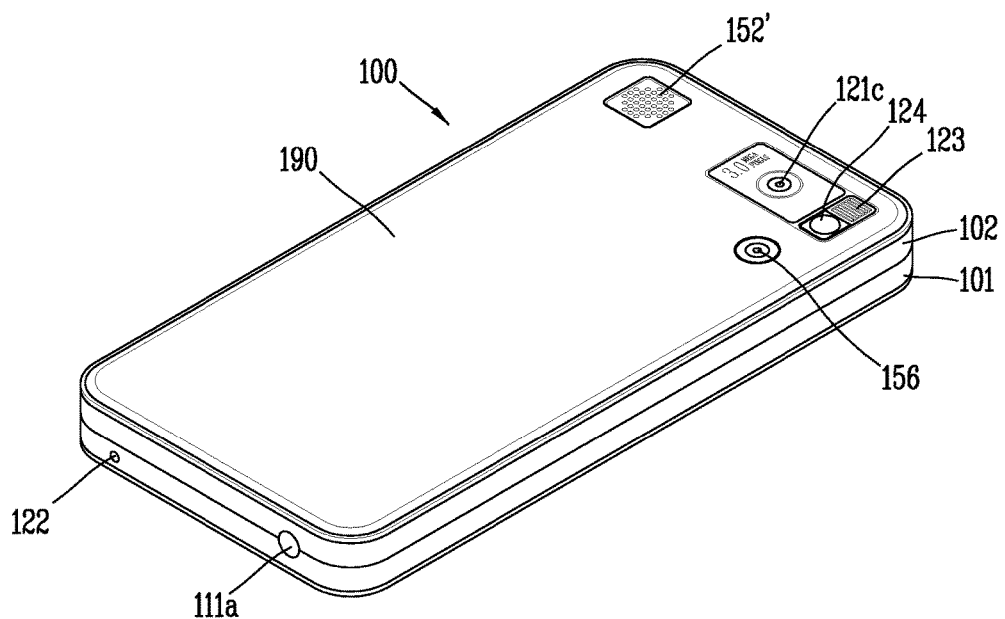
FIG. 3 is a rear perspective view of the mobile terminal of FIG. 2.

FIG. 3 is a rear perspective view of the mobile terminal 100 illustrated in FIG. 2.

Referring to FIG. 3, the rear surface of the terminal body is further shown having a third camera module 121c. The third camera module 121c faces a direction which is substantially opposite to directions faced by the first and second camera modules 121a and 121b (see FIG. 2). Also, the third camera module 121c may be a camera having different pixels from those of the first and second camera modules 121a and 121b.

For instance, the first and second camera modules 121a and 121b may operate with relatively lower pixels (lower resolution). Thus, the first and second camera modules 121a and 121b may be useful when a user can capture his face and send it to another party during a video call or the like. On the other hand, the third camera module 121c may operate with relatively higher pixels (higher resolution) such that it can be useful for a user to obtain higher quality pictures for later use. The first to third cameras 121a, 121b and 121c may be installed in the terminal body to be rotatable or popped up.

A flash 123 and a mirror 124 may be disposed adjacent to the third camera module 121c. The flash 123 operates in conjunction with the third camera module 121c when taking a picture using the third camera module 121c. The mirror 124 can cooperate with the third camera module 121c to allow a user to photograph himself in a self-portrait mode.

A second audio output module 152' may further be disposed on the rear surface of the terminal body. The second audio output module 152' may cooperate with the audio output unit 152 (see FIG. 2) to provide stereo output in a phone-call mode.

A broadcast signal receiving antenna 111a may further be disposed at the side surface of the terminal body, in addition to an antenna for call connection. The antenna 111a forming a part of the broadcast receiving module 111 (see FIG. 1) may be retractably into the terminal body.

The terminal body is shown having a power supply unit 190 for supplying power to the mobile terminal 100. The power supply unit 190 may be mounted inside the terminal body or detachably coupled to the terminal body.

The holography module 156 may be disposed on the rear surface of the terminal body to output the holographic image 156' to a space on the rear surface.

Figure 4A:
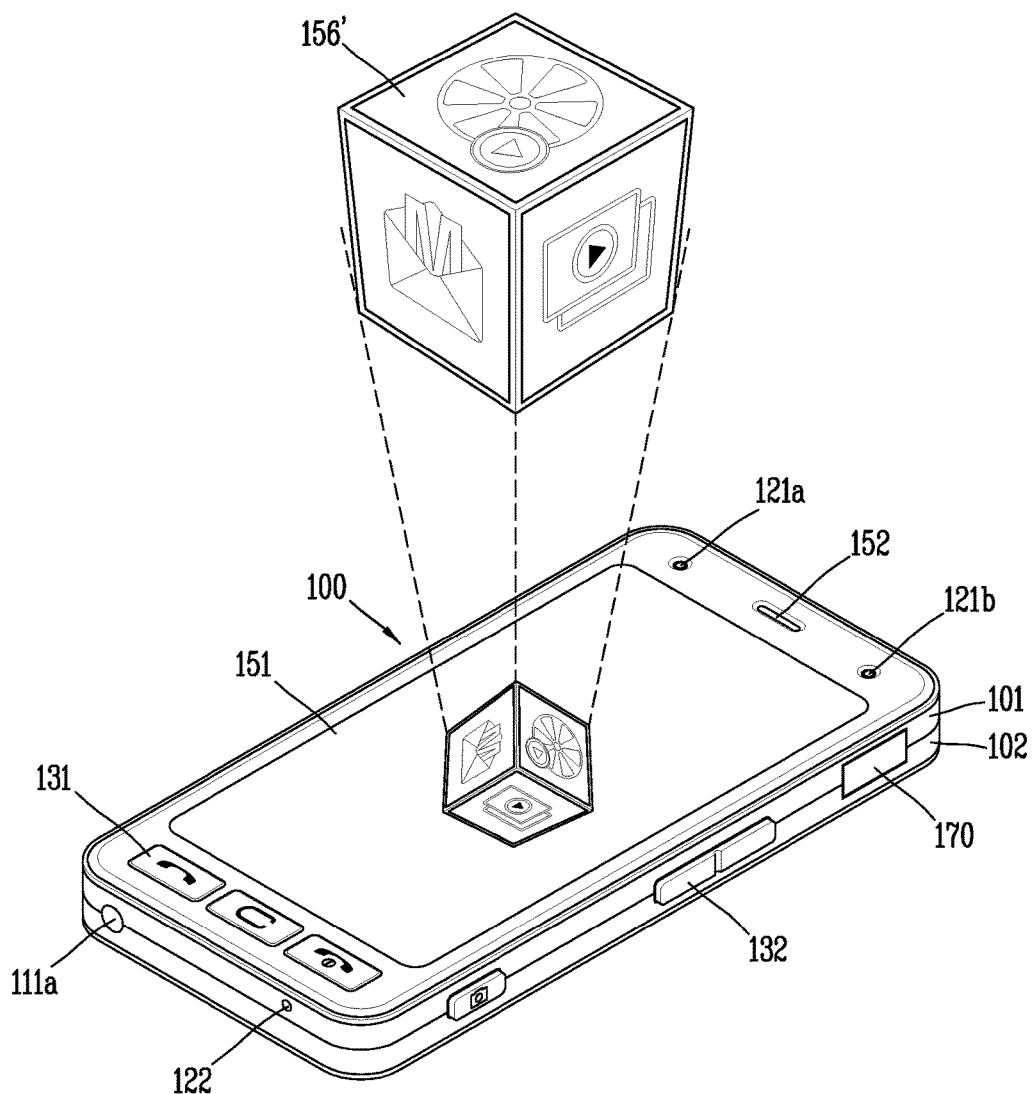
FIGS. 4A and 4B are conceptual views illustrating a holographic image implemented by a holography module of FIG. 2.
Figure 4B:
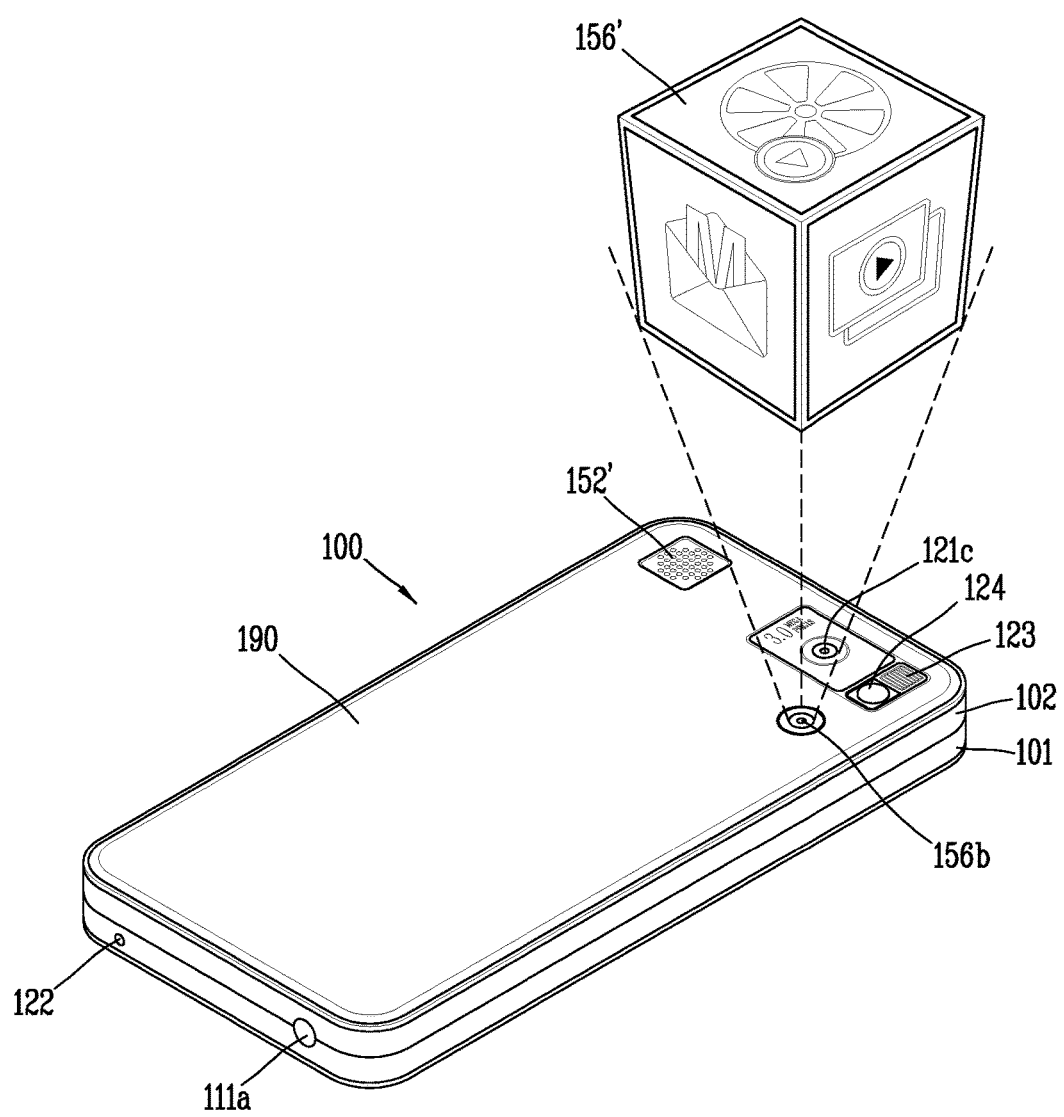

FIGS. 4A and 4B are conceptual views illustrating a holographic image 156' implemented by the holography module of FIG. 2.

As illustrated in FIG. 4A, the holography module 156 may be disposed on the front surface of the mobile terminal 100. For example, the holography module 156 may be disposed to overlap the display unit 151 so as to output the holographic image 156' along with visual information output on the display unit 151, or independently output the holographic image 156' when the display unit 151 is powered off. The holography module 156 may be mounted onto a bezel portion which surrounds the display unit 151.

Also, as illustrated in FIG. 4B, the holography module 156 may be disposed on the rear surface of the mobile terminal 100 to output the holographic image 156' to a preset space of the rear surface.

The mounting position of the holography module 156 and the output space of the holographic image 156' may not be limited to those. The holography module 156 may be configured to be rotatable or popped up, and also be detachably installed as a separate device on the terminal body. The holographic image 156' may be output to a space, which is irrelevant to an installation direction of the holography module 156, in a tilting manner or by employing a separate reflection structure.

The holographic image 156' which can be represented by the holography module 156 may include both a two-dimensional (2D) monoscopic image and a 3D stereoscopic image.

Monoscopic imaging is a method of providing the same image to both eyes, namely, a method in which a polyhedron, which is generated by at least one point, line, surface or a combination thereof, is disposed on a virtual stereoscopic space and an image of the polyhedron viewed from a specific view point is output.

Stereoscopic imaging is a method of providing different images to both eyes, respectively, namely, a method using a principle that the human being feels stereoscopic when viewing an object with two eyes. That is, the two eyes of the human being view different monoscopic images when viewing the same object, due to a distance therebetween. The different monoscopic images are transferred to the brain through the retina, and unified (combined) in the brain, such that depth and reality of a stereoscopic image can be felt. Therefore, although slightly different in persons, binocular disparity due to the distance between both eyes brings about stereoscopic feeling. The stereoscopic imaging is a method of displaying an image using the binocular disparity.

The holographic image 156' which is generated by the holography module 156 to be explained later may include both the monoscopic image and the stereoscopic image. Hereinafter, for the sake of explanation, an image representation according to the monoscopic imaging method may include an image representation according to the stereoscopic imaging method.

Hereinafter, description will be given in detail of a method of representing (or realizing) the holographic image 156', which may be applied to the exemplary embodiments disclosed herein, and a structure for implementing (realizing) the method.

An image output through the display unit 151 merely records only a distribution of bright and dark surfaces of an object, whereas the holographic image 156' may be understood as an image which simultaneously accumulates and reproduces all of information which light as wave contains, namely, amplitude and phase.

Figure 5A:
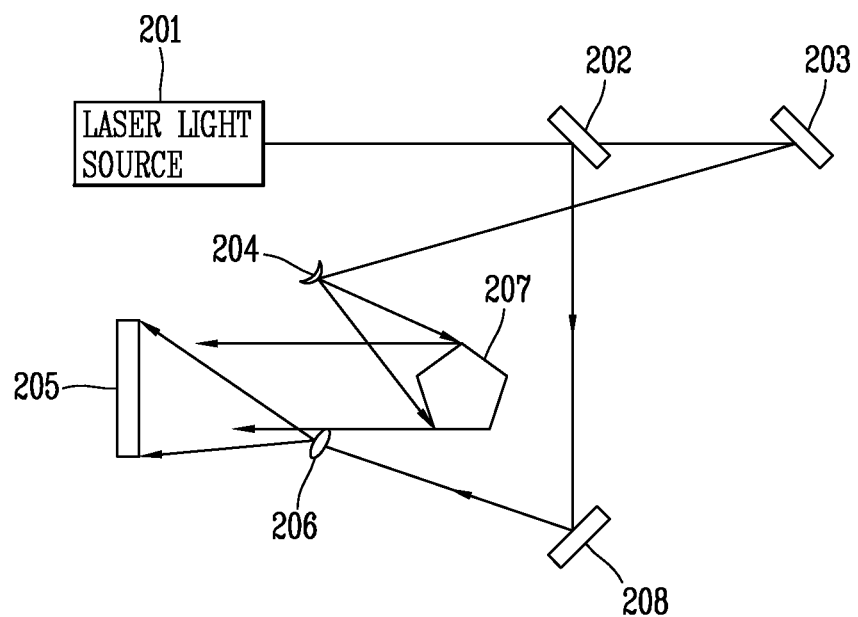
FIGS. 5A and 5B are conceptual views illustrating a principle of holography.
Figure 5B:
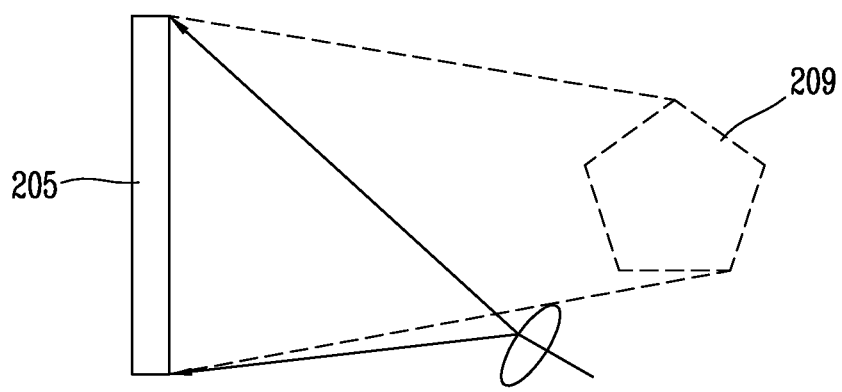

FIGS. 5A and 5B are conceptual views illustrating a principle of holography.

As illustrated in FIG. 5A, coherent beams (light) emitted from a laser light source 201 may be split into two parts through a splitter 202.

One of the two parts of beams may illuminate an object 207 (an object to be captured), and beams that are scattered and reflected on a surface of the object 207 may reach a holographic photosensitive material 205. Hereinafter, the beam is referred to as an object wave. Mirrors 203 and 204 may be used to turn (change) a path of the light.

The other beams may be turned to a path toward a mirror 208, diffused through a lens 206, and directly reach an entire surface of the holographic photosensitive material 205. Hereinafter, this beam is referred to as reference wave.

The object wave and the reference wave bring about interference on the holographic photosensitive material 205, thereby giving rise to very delicate, complicated interference fringes, which are 500 to 1500 in number per 1 mm. A holographic storage medium for recording such interference fringes is referred to as a hologram.

Afterwards, referring to FIG. 5B, when the beams such as the reference waves, namely, reconstruction waves are projected to the holographic photosensitive material 205, the interference fringes may serve as diffraction grating, such that the beams can be diffracted at different positions from an incident direction of the reference waves. The diffracted beams may be converged so as to be formed the same as the beams initially reflected from the object, thereby projecting a holographic image 209. That is, the initial object waves may be reconstructed through the hologram so as to realize the holographic image 209.

Here, when viewed from an inside of a reconstructed wave front, the original object is viewed but it seems like the object is located inside. And, if a viewing point (view point) is moved, a position where the object is viewed is also changed. It feels like to view a 3D image. Also, since the wave front of the original object is reconstructed, it may cause interference against a wave front which comes from a very slightly deformed object.

Figure 6A:
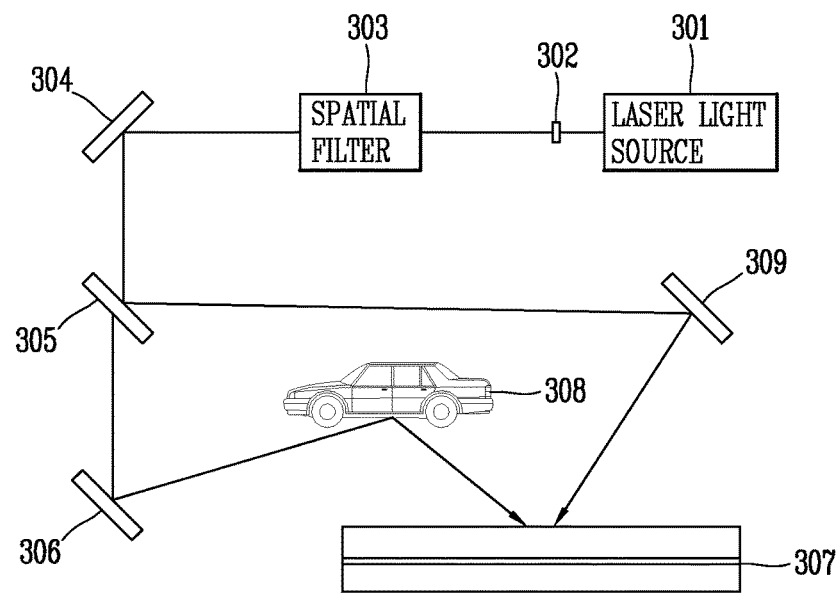
FIGS. 6A to 6C are conceptual views illustrating transmission-type holography.
Figure 6B:
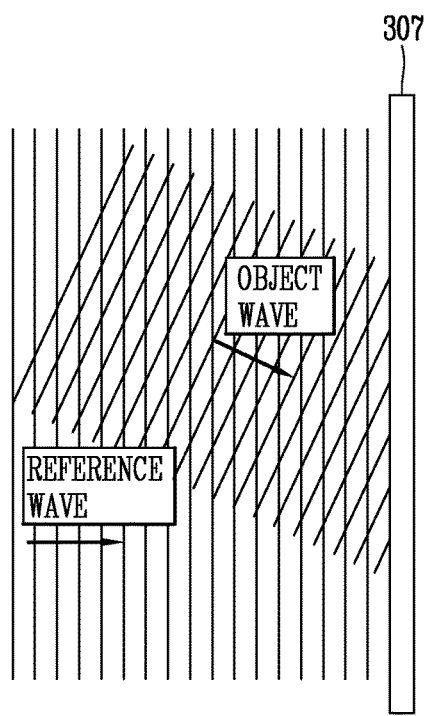
Figure 6C:
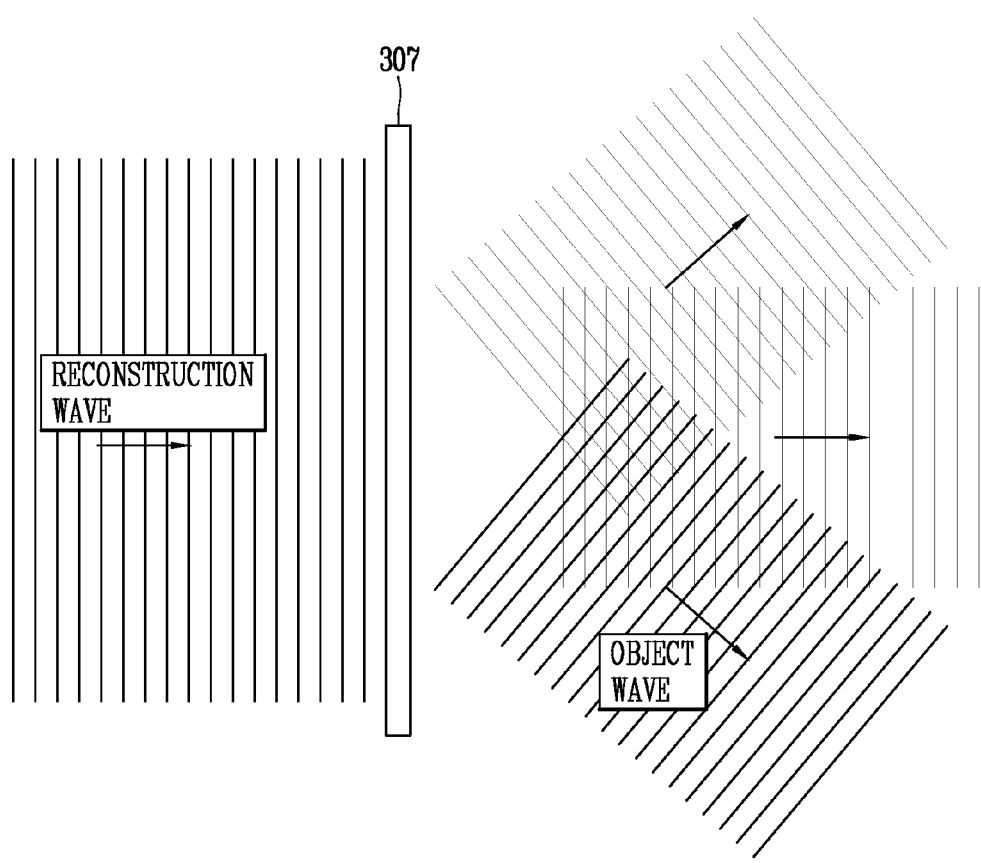
Figure 7A:
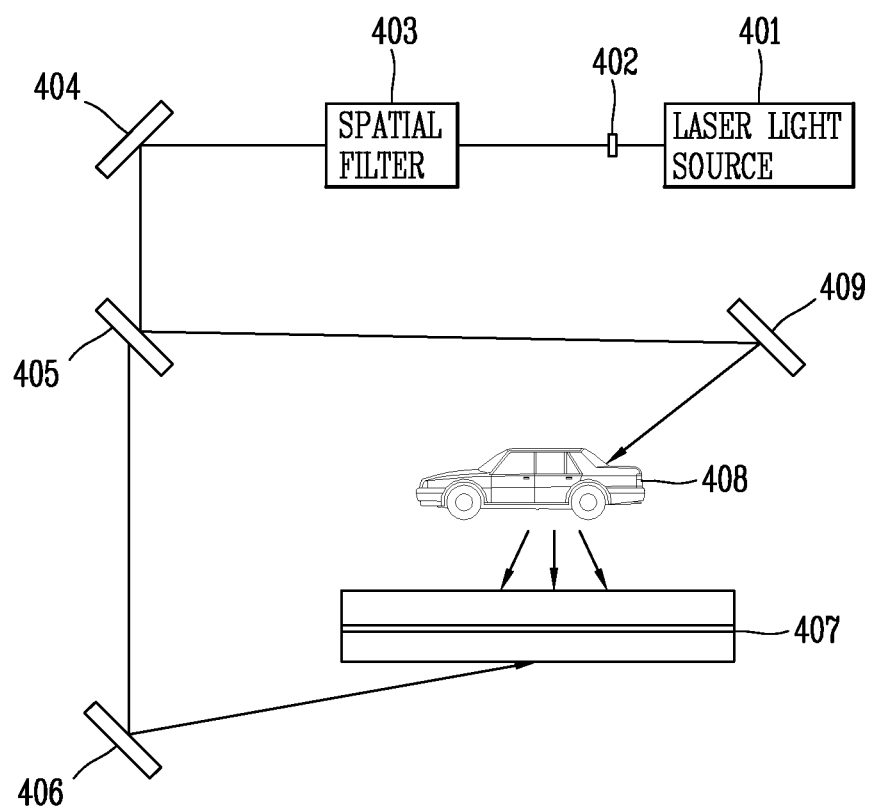
FIGS. 7A to 7C are conceptual views illustrating reflection-type holography.
Figure 7B:
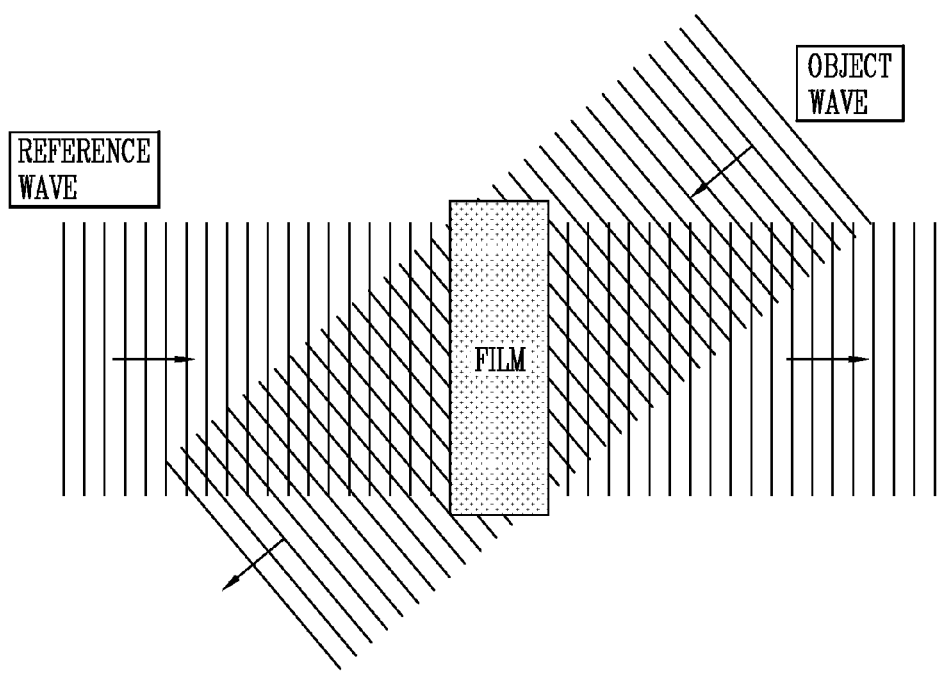
Figure 7C:
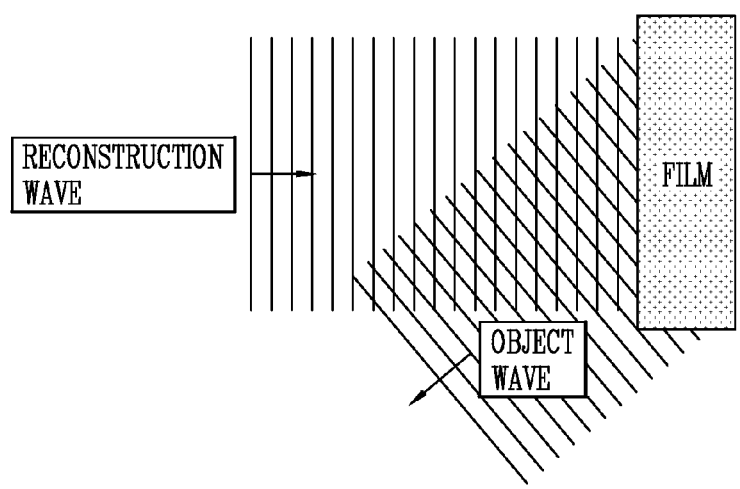

Methods of realizing the holographic image 209 may be classified into transmission-type holography, and reflection-type holography. FIGS. 6A to 6C are conceptual views illustrating the transmission-type holography, and FIGS. 7A to 7C are conceptual views illustrating the reflection-type holography.

Transmission-type holography is a technique of observing an image, which is made by light that is illuminated from a rear side of a hologram and transmitted through the hologram, in front of the hologram. The transmission type holography has characteristics that object waves and reference waves are exposed to a holographic photosensitive material in the same direction upon producing a holographic image, and the generated holographic image is vivid and bright in color.

Referring to FIG. 6A, beams emitted from a laser light source 301 may be transmitted through a spatial filter 302 and spread as smooth spherical waves. The spherical waves may be split into two parts of waves through a beam splitter 305. One of the two split spherical waves may be illuminated on an object 308 to generate object waves, and the other may be illuminated on a holographic photosensitive material 307 so as to generate reference waves. The object waves illuminated on the object 308 may also be illuminated on the holographic photosensitive material 307. Mirrors 304, 306 and 309 may be used for turning paths of the beams.

Here, the object waves and the reference waves which are illuminated on the holographic photosensitive material 307 may interfere with each other to generate interference fringes. The interference fringes may then be recorded in the holographic photosensitive material 307.

That is, as illustrated in FIG. 6B, the object waves and the reference waves may all be projected on the same surface of the holographic photosensitive material 307, and generate the interference fringes.

Afterwards, referring to FIG. 6C, upon projecting reproduction waves which are the same as the reference waves on the holographic photosensitive material 307, the object waves may be transmitted in an opposite direction to the surface on which the object waves and the reference waves have been incident, thereby producing a holographic image.

Next, reflection-type holography is a technique of observing an image, which is made by light that is illuminated to the front of a hologram and reflected on the hologram, in front of the hologram. The reflection-type holography may be manufactured such that object waves and reference waves are incident onto a holographic photosensitive material in opposite directions to each other. A holographic image produced according to the reflection-type holography technique exhibits a characteristic of providing excellent 3D effect.

Referring to FIG. 7A, as similar to FIG. 6A, beams emitted from a laser light source 401 may be transmitted through a spatial filter 402 and spread as smooth spherical waves. The spherical waves may be split into two parts of waves through a beam splitter 405. One of the two split spherical waves may be illuminated on an object 308 to generate object waves, and the other may be illuminated on a holographic photosensitive material (film) 407 so as to generate reference waves. Mirrors 404, 406 and 409 may be used for turning paths of the beams. Here, unlike FIG. 6A, the reference waves and the object waves may be illuminated on the holographic photosensitive material 407 at opposite positions to each other.

That is, referring to FIG. 7B, the reference waves may be projected through a left surface of the holographic photosensitive material 407, and the object waves may be projected through a right upper surface of the holographic photosensitive material 407. Afterwards, referring to FIG. 7C, if reconstruction waves which are the same as the reference waves are projected through the holographic photosensitive material 407, the object waves may be transmitted in an opposite direction, thereby producing a holographic image.

The holographic photosensitive material 307, 407 disclosed herein may be expressed as a holographic storage medium which is equipped in a holographic storage unit, and another component which is capable of producing a holographic image by projecting light onto the holographic photosensitive material 307, 407 may be expressed as a holographic output unit.

For the sake of explanation, this specification illustrates that the holographic storage unit and the holographic output unit are all included in the holography module 156. However, this embodiment is merely illustrative, and they may be included in the mobile terminal 100 as separate components.

Meanwhile, in relation to one exemplary embodiment disclosed herein, a holographic image may be displayed according to a set holographic pattern. The holographic pattern refers to that a holographic image projected through the holography module 156 is changed into a preset pattern according to the lapse of time so as to be provided to a user.

The holographic pattern may be variously set according to the following methods.

First, the holographic pattern may be set in a manner of changing a distance difference between the holographic output unit and a holographic image according to the lapse of time. With the configuration, the holographic image projected through the holography module 156 can be moved up and down, which may allow for setting a predetermined holographic pattern.

Next, the holographic pattern may be set in a manner of changing a shape of the holographic image projected through the holography module 156 according to the lapse of time. For example, the controller 180 may control the holographic image projected through the holography module 156 to first have a circular shape and then control the circular shape to change into a rectangular shape according to the lapse of time.

Also, the holographic pattern may be set by applying a method of moving to left or right or rotating the holographic image projected through the holography module 156. That is, a holographic pattern may be set in a manner of moving to left or right or rotating a transmitted holographic image or rotating the holographic image with moving it to left or right according to the lapse of time, while maintaining a distance difference between the holography module 156 and the holographic image.

The holographic pattern may also be set in a manner of changing a color or size of the projected holographic image or controlling the holographic image to be flickered according to the lapse of time. In addition, the holographic pattern may also be set by projection brightness, reproduction frequency, lighting, vibration feedback, sound insertion, image insertion, repetitive projection and the like.

Here, the foregoing description has been given under assumption that the holographic pattern is set by individual factors, but the holographic pattern may also be set by a plurality of factors. For example, the holographic pattern may be set in a manner of moving to left or right or rotating the projected holographic image while changing a distance difference between the holography module 156 and the holographic image according to the lapse of time.

The foregoing description has been given under assumption that the holographic pattern is set with respect to the entire holographic image, but the embodiment is merely illustrative. The holographic pattern may also be applicable only to a partial area of the holographic image.

Figure 8:
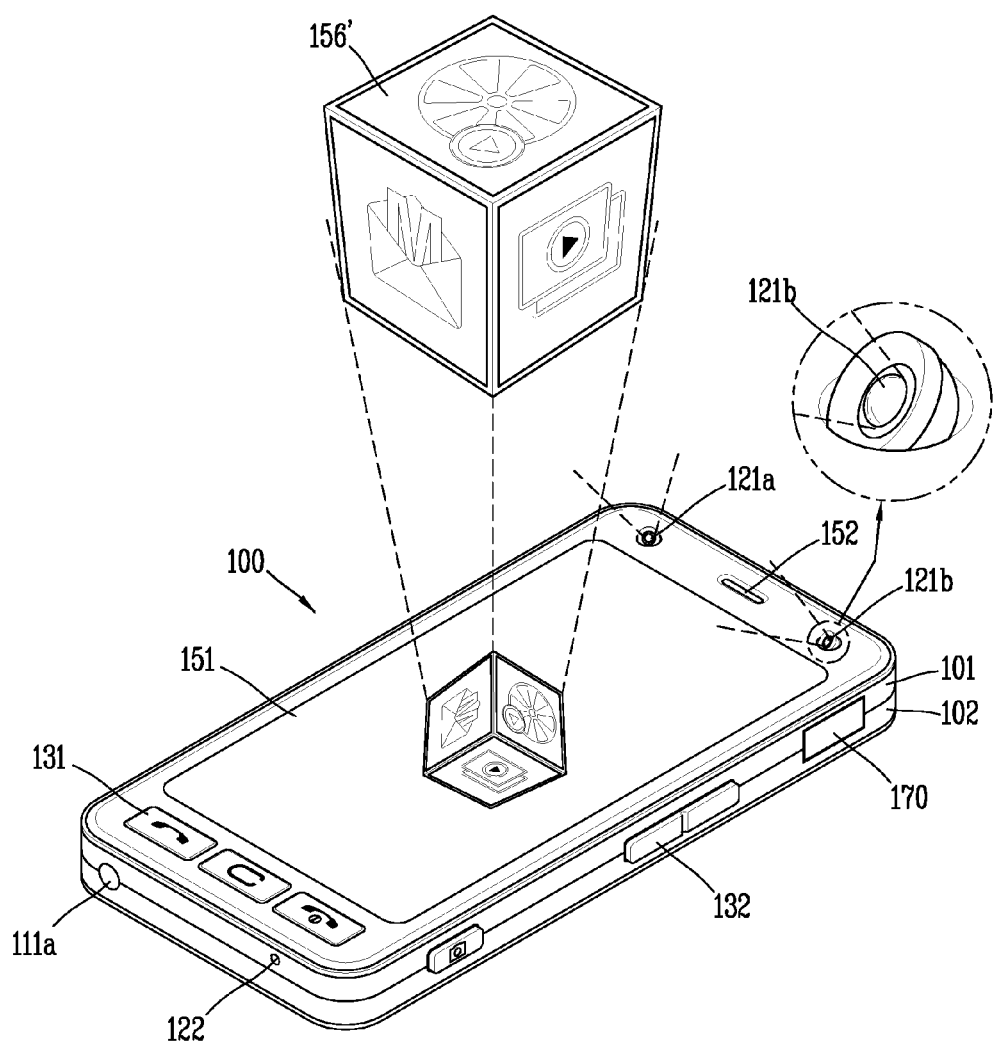
FIG. 8 is a conceptual view illustrating that first and second camera modules capture (photograph) a holographic image.
Figure 9:
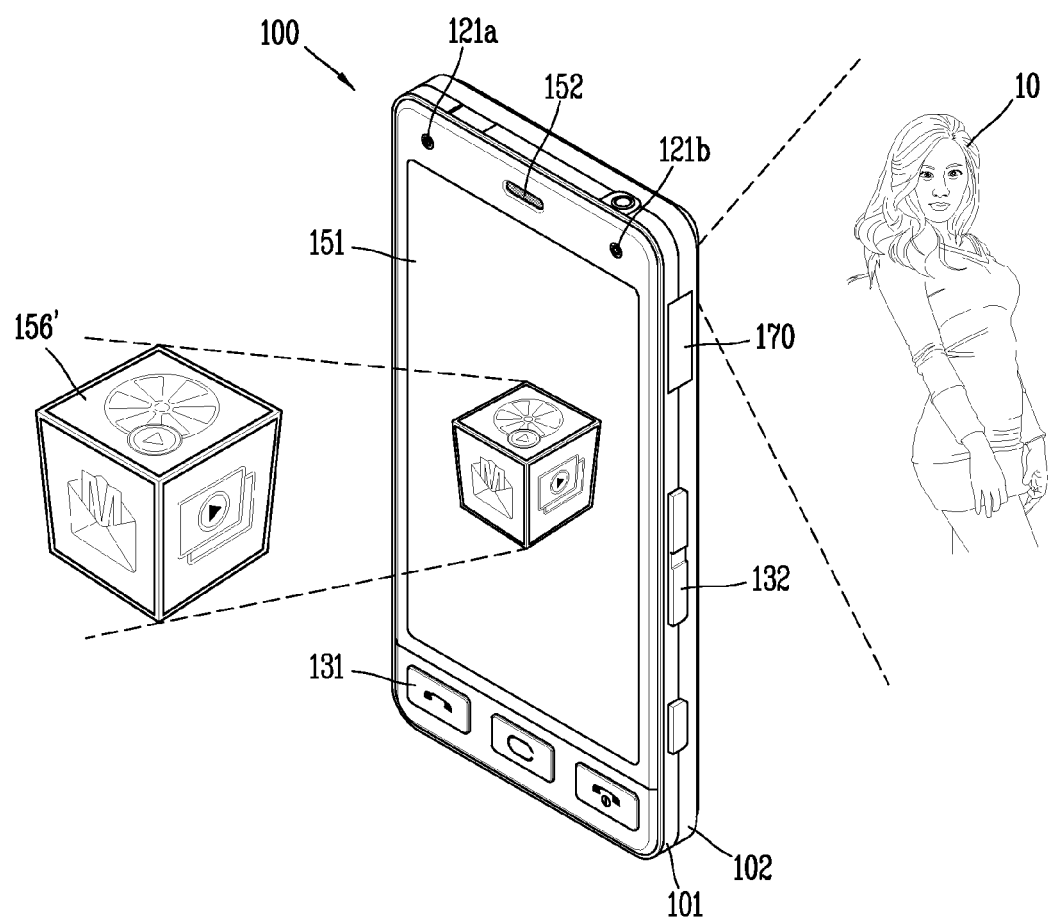
FIG. 9 is a conceptual view illustrating that first and third camera modules that are illustrated in FIGS. 2 and 3, respectively, capture a holographic image and an area (user) except for the holographic image, respectively.
Figure 10:
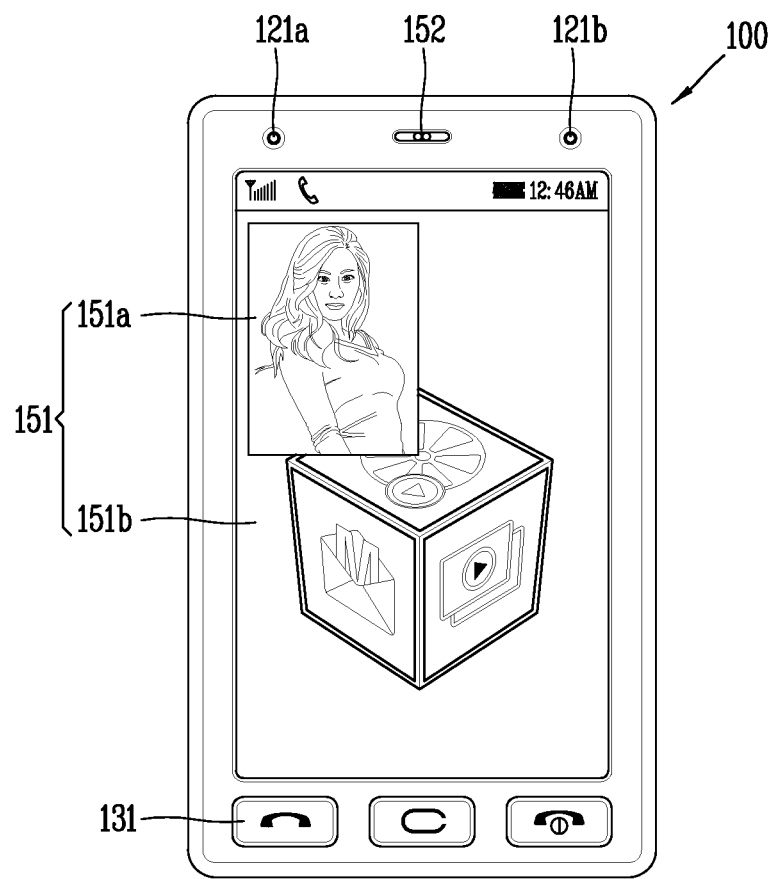
FIG. 10 is a conceptual view illustrating that the images captured in FIG. 9 are output on a display unit of FIG. 2 in a dividing manner.

FIG. 8 is a conceptual view illustrating that the first and second camera modules 121a and 121b of FIG. 2 capture (photograph) the holographic image 156', FIG. 9 is a conceptual view illustrating that the first and third camera modules 121a and 121c that are illustrated in FIGS. 2 and 3, respectively, capture the holographic image 156' and an area [user 10] except for the holographic image 156', respectively, and FIG. 10 is a conceptual view illustrating that the images captured in FIG. 9 are output to the display unit 151 of FIG. 2 in a dividing manner.

As illustrated in FIGS. 8 to 10, the holography module 156 may be mounted onto the terminal body to output the holographic image 156' to a preset space. The preset space may be decided based on an arrangement of the holography module 156, attributes of the holographic image 156' [for example, size, direction (orientation) and the like of the holographic image 156']. The preset space, for example, may be limited to an inner space of a virtual sphere/hemisphere having a specific radius based on a center of the holography module 156.

FIGS. 8 and 9 exemplarily illustrate that the holography module 156 outputs the holographic image 156' along with visual information which is displayed on the display unit 151, or independently outputs the holographic image 156' when the display unit 151 is powered off.

As aforementioned, the holography module 156 may include a holographic storage unit, and a holographic output unit.

The holographic storage unit may include a holographic storage medium for recording interference fringes which are generated due to interference between irradiated object waves and reference waves. The holographic storage medium may be made of a material, such as photopolymer, which gives rise to a change in response to light.

The holographic output unit may irradiate reconstruction waves which are the same as the reference waves to the holographic storage unit (in detail, the holographic storage medium). The holographic output unit may then output the holographic image 156', which is generated in a manner that the irradiated reconstruction waves are diffracted due to the interference fringes recorded in the holographic storage medium, to a preset space.

A camera 121 may be installed in the terminal body. The camera 121 may capture the holographic image 156' so as to process an image frame, such as a still image or a video obtained by an image sensor. The processed image frame may be displayed on the display unit 151, stored in the memory 160, or externally transmitted through the wireless communication unit 110.

Those drawings exemplarily illustrate that the first camera module 121a and the second camera module 121b are installed on the front surface of the terminal body, and the third camera module 121c is installed on the rear surface of the terminal body.

The first to third camera modules 121a, 121b and 121c may be disposed toward the preset space for capturing the holographic image 156'. The first to third camera modules 121a, 121b and 121c may be configured to face the preset space in a sliding, tilting or rotating manner.

Angles at the first to third camera modules 121a, 121b and 121c face the preset space may be adjustable. For example, in an automatic mode, the controller 180 may recognize/analyze the holographic image 156', search for an optimal angle, and automatically adjust the angle. On the other hand, in a manual mode, the holographic image 156', which the first to third camera modules 121a, 121b and 121c face, may be output to the display unit 151, and a user may directly adjust a capturing range, an angle and the like of the holographic image 156' by touching and dragging the display unit 151 or by manipulating the user input unit 130, such that the angles of the first to third camera modules 121a, 121b and 121c can be adjusted.

The first to third camera modules 121a, 121b and 121c may focus on the preset space, and accordingly a more vivid image can be obtained. The controller 180 may recognize/analyze the holographic image 156' so as to automatically adjust the focuses of the first to third camera modules 121a, 121b and 121c.

The controller 180 may also analyze the holographic image 156' captured by the first to third camera modules 121a, 121b and 121c, and adjust settings of the holographic output unit. Theoretically, the holographic output unit has to irradiate the reconstruction waves, which are the same as the reference waves incident onto the holographic storage unit, to the holographic storage unit. However, it is actually difficult to exactly match characteristics (an incident angle, wavelength and the like with respect to the holographic storage medium) of the reconstruction waves irradiated from the holographic output unit, based on metadata stored in the memory. Therefore, the controller 180 may be provided with a feedback system for finely adjusting the characteristics of the irradiated reconstruction waves by analyzing the holographic image 156' as an output product.

The controller 180 may also adjust characteristics, which are influenced by ambient environment conditions or personal taste by analyzing the holographic image 156' captured by the first to third camera modules 121a, 121b and 121c. For example, if it is necessary to realize the holographic image 156' to be brighter because the surrounding becomes darker, if it is difficult to recognize edges of the holographic image 156' because the holographic image 156' is not clear or the color of the holographic image 156' is similar to its background, or if the holographic image 156' is shaken, the controller 180 may automatically adjust the characteristics of the holographic image 156'.

Referring back to FIG. 3, the flash 123 may be disposed to face the preset space so as to illuminate the holographic image 156'. For example, the flash 123 may be disposed to face the preset space in a sliding, tilting or rotating manner. The first to third camera modules 121a, 121b and 121c may receive a sufficient quantity of light through the flash even at a dark place so as to capture the more clear holographic image 156'.

Referring to FIG. 8, the first and second camera modules 121a and 121b may be configured to independently capture the holographic image 156' or may be configured to capture the 3D holographic image 156' by combination thereof. To capture the 3D holographic image 156', the first and second camera modules 121a and 121b may be spaced apart from each other with a preset distance. The first and second camera modules 121a and 121b may capture a left view image and a right view image, and the controller 180 may then unify the left and right view images to generate the 3D holographic image 156'.

Referring to FIG. 9, the first and/or second camera module(s) 121a and/or 121b may be configured to capture the holographic image 156', and the third camera module 121c may be configured to capture the other area except for the preset space when the first and/or second camera module(s) 121a and/or 121b capture(s) the holographic image 156'. For instance, the third camera module 121c may capture a user 10 at the moment that the holographic image 156' is output.

Referring to FIG. 10, the holographic image 156' captured by the first and/or second camera module(s) 121a and/or 121b and the image of the user 10 captured by the third camera module 121c may be output to the display unit 151 in a dividing manner. For example, the holographic image 156' may be output to occupy most of the main surface of the display unit 151 (i.e., a first area 151a), and the user's image may be output to occupy a relatively small area (i.e., a second area 151b). An output method of the captured images, such as arrangement, areas and the like of the first and second areas 151a and 151b, may be changed by a touch input applied in a dragging or clamping manner, by a manipulation of the user input unit 130, by tilting of the terminal body, and the like.

With the configuration, the first to third camera modules 121a, 121b and 121c may be arranged to face the preset space to capture the holographic image 156'. This may allow the mobile terminal 100 to implement more various user interfaces using the captured holographic image 156'.

Hereinafter, description will be given in detail of a holography control system 600 in which a target apparatus 500 captures the holographic image 156' through communication with the mobile terminal 100.

Figure 11:
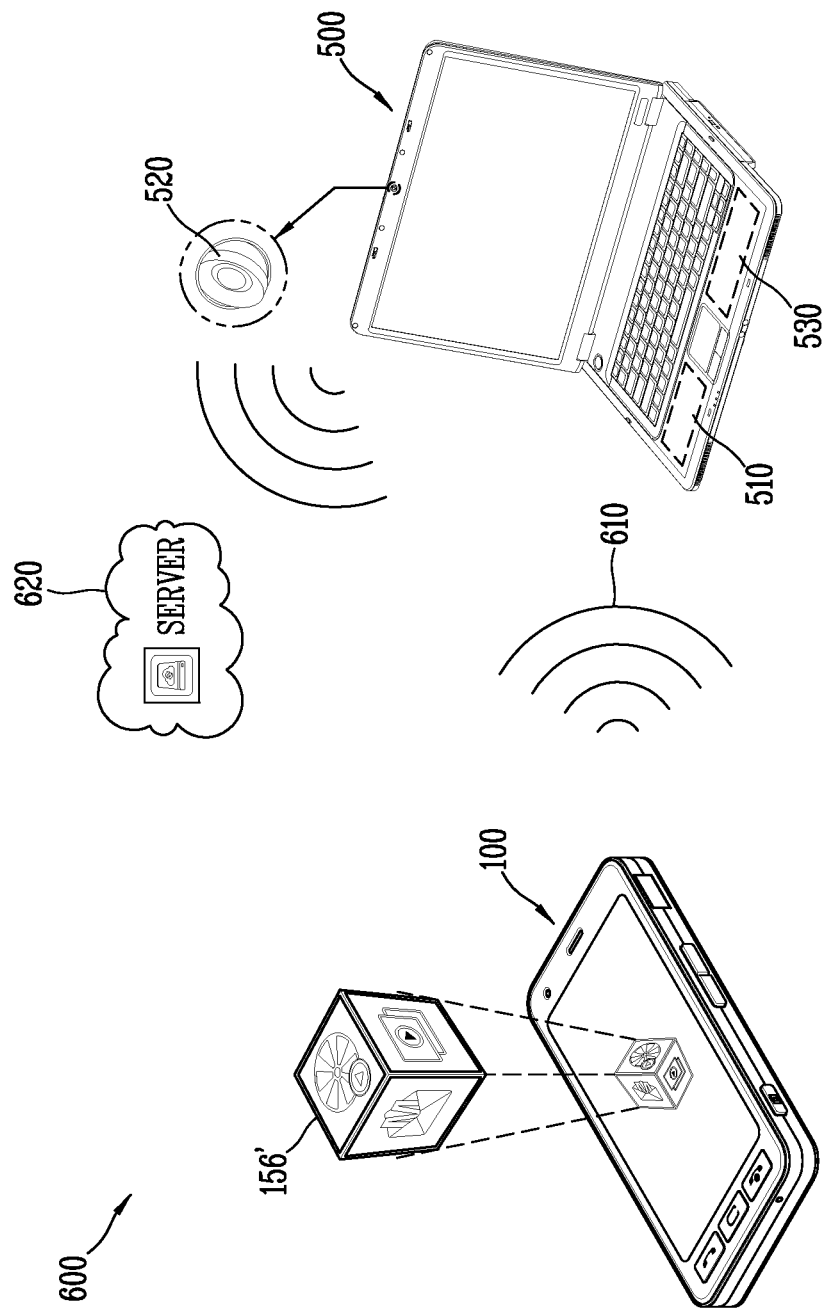
FIGS. 11 and 12 are a conceptual view and a flowchart illustrating that a target apparatus captures the holographic image illustrated in FIG. 2.
Figure 12:
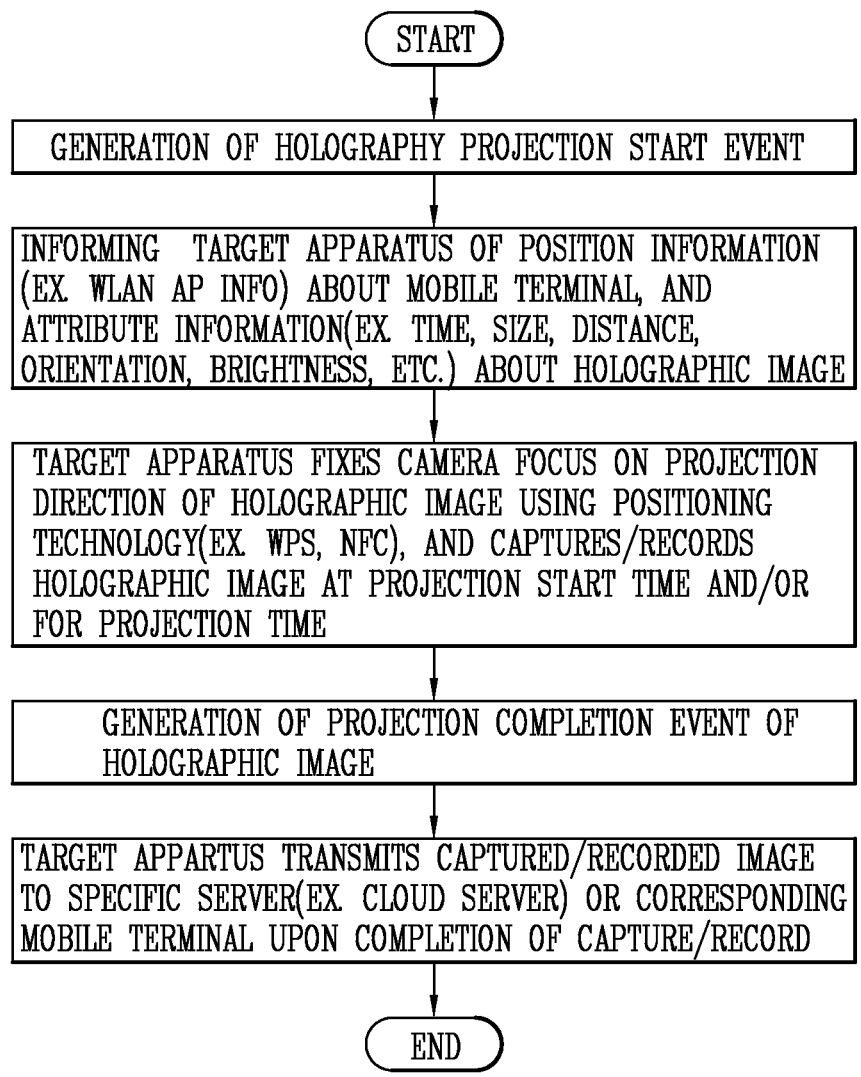

FIGS. 11 and 12 are a conceptual view and a flowchart, respectively, illustrating that a target apparatus 500 captures the holographic image 156' illustrated in FIG. 2.

As illustrated in FIGS. 11 and 12, the mobile terminal 100 may transmit a packet 610 which includes position information related to the terminal body and attribute information related to the holographic image 156'. For example, the terminal body-related position information may be WLAN access point Info which includes information related to AP MAC address, AP signal strength and the like. Also, the attribute information related to the holographic image 156' may include information related to size, orientation, brightness, projection time, distance and the like, of the holographic image 156'.

The target apparatus 500 may be configured to communicate with the mobile terminal 100, and include a wireless communication unit 510, a capturing unit 520, and a controller 530. The target apparatus 500 may not be limited to a mobile terminal but may be any electronic device if it has such construction. Hereinafter, the target apparatus 500 will be exemplarily illustrated as a notebook.

The wireless communication unit 510 may receive the packet 610, and the capturing unit 520 may capture the holographic image 156' using the packet 610. Here, the controller 530 may acquire position information related to a preset space, to which the holographic image 156' is output, based on the packet 610 by use of a positioning technique which uses Wi-Fi, Cell-ID, GPS signal, NFC, and the like.

Among other positioning techniques, a Wi-Fi positioning system (WPS) will be briefly described. A position of the mobile terminal 100 is decided using virtual AP DB information constructed through War-driving and WLAN AP Info of the mobile terminal 100. That is, the WPS acquires the position information on the mobile terminal 100 through triangulation which is executed based on a position of Wi-Fi AP.

The capturing unit 520 may be movable to face the preset space based on the acquired position information in a sliding, tilting or rotating manner. The capturing unit 520 may focus on the preset space so as to obtain a vivid image for the holographic image 156'. Or, the controller 530 may recognize the holographic image 156' so as to automatically adjust the focus of the capturing unit 120.

The capturing unit 520 may capture the holographic image 156' under optimal conditions based on the attribute information on the holographic image 156'. For example, the capturing unit 520 may be zoomed in/out according to the size of the holographic image 156', adjust an exposure degree according to the holographic image 156156' and ambient brightness, and set a capturing time according to a projection time.

The capturing unit 520 may also be configured to capture not only the preset space, to which the holographic image 156' is output, but also the other area except for the preset space. For example, the capturing unit 520 may be configured to capture a background including the holographic image 156', or an image of the user 10 who views the holographic image 156'.

Upon completely projecting the holographic image 156', the capturing unit 520 may terminate the capturing, and the wireless communication unit 520 may transmit the holographic image 156' captured by the capturing unit 520 to a server 620. The server 620, for example, may be a cloud server, an email server of a user account, a social network service server of the user account, and the like.

Figure 13:
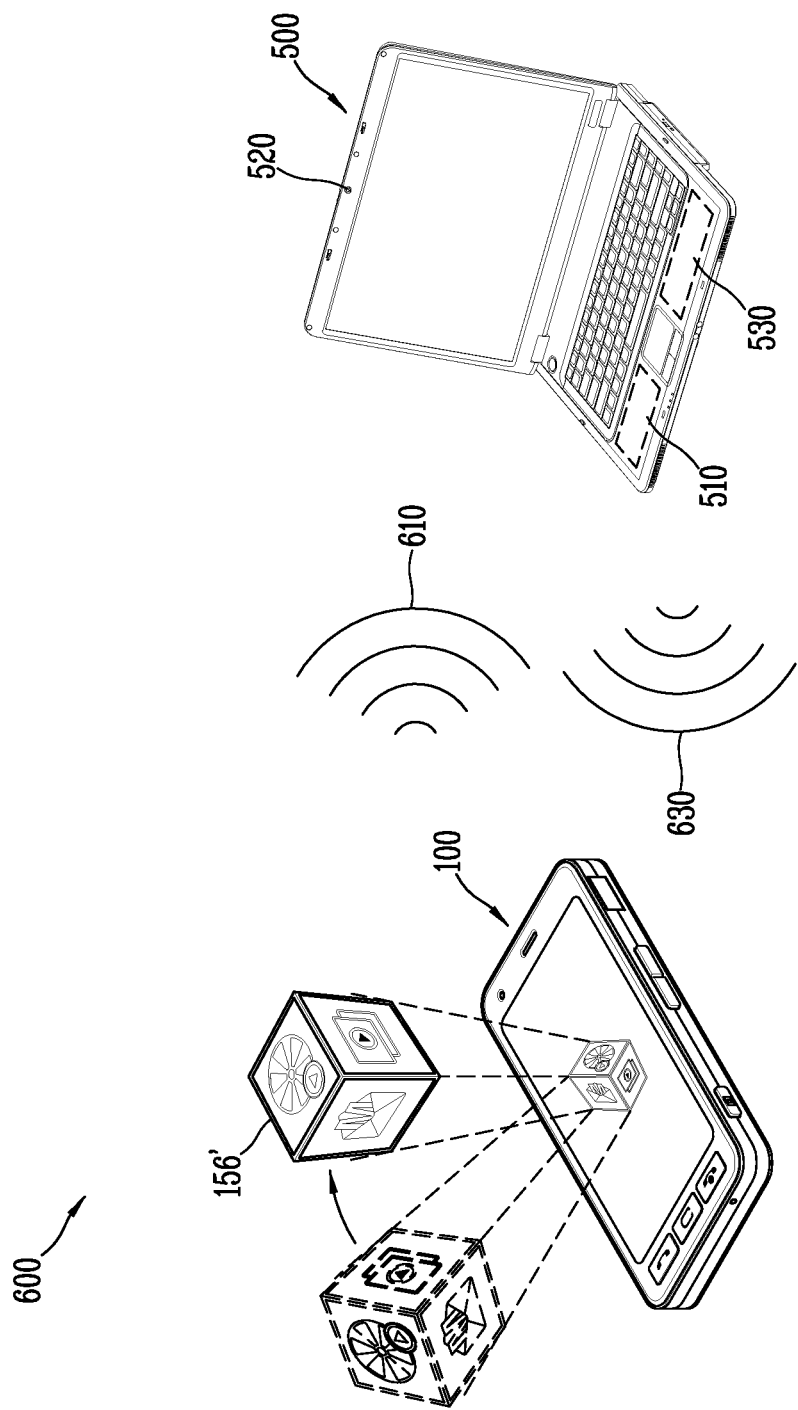
FIGS. 13 and 14 are a conceptual view and a flowchart illustrating that the holography module of FIG. 2 adjusts a projection direction of a holographic image based on relative position information related to the mobile terminal and a target apparatus.
Figure 14:
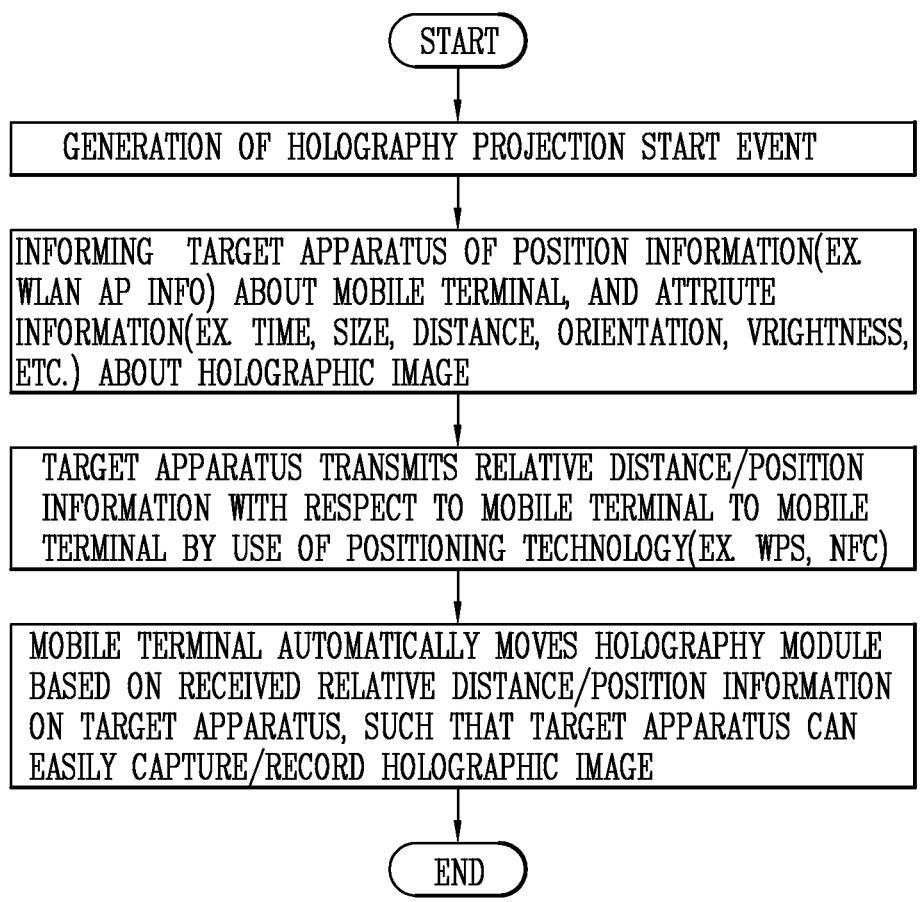

FIGS. 13 and 14 are a conceptual view and a flowchart, respectively, illustrating that the holography module 156 of FIG. 2 adjusts a projection direction of the holographic image 156' based on relative position information 630 related to the mobile terminal 100 and the target apparatus 500.

As illustrated in FIGS. 13 and 14, the wireless communication unit 510 of the target apparatus 500 may transmit relative position information 630 with respect to the mobile terminal 100 and the target apparatus 500 based on the received packet 610, which has been illustrated with reference to FIGS. 11 and 12, to the mobile terminal 100. The relative position information 630 may include both position information related to the target apparatus 500 and position information related to the capturing unit 520.

The holography module 156 of the mobile terminal 100 may adjust a projection direction of the holographic image 156' based on the relative position information 630. That is, the holography module 156 may adjust the projection direction such that the holographic image 156' can be located within a capturing range of the capturing unit 520.

Here, the flash 123 of the mobile terminal 100 may be disposed to face the preset space to illuminate the holographic image 156'. The flash 123 may also be configured to adjust its illumination direction based on the relative position information.

The controller 530 of the target apparatus 500 may analyze the holographic image 156' captured by the capturing unit 520 so as to generate a corresponding operation command (instruction). For example, the controller 530 may sense the holographic image 156' with a specific pattern so as to execute an authentication as to whether it is a specific user or execute a specific program, such as video, music or the like.

Hereinafter, description will be given in detail of how to apply the control method using the holographic image 156'.

Figure 15:
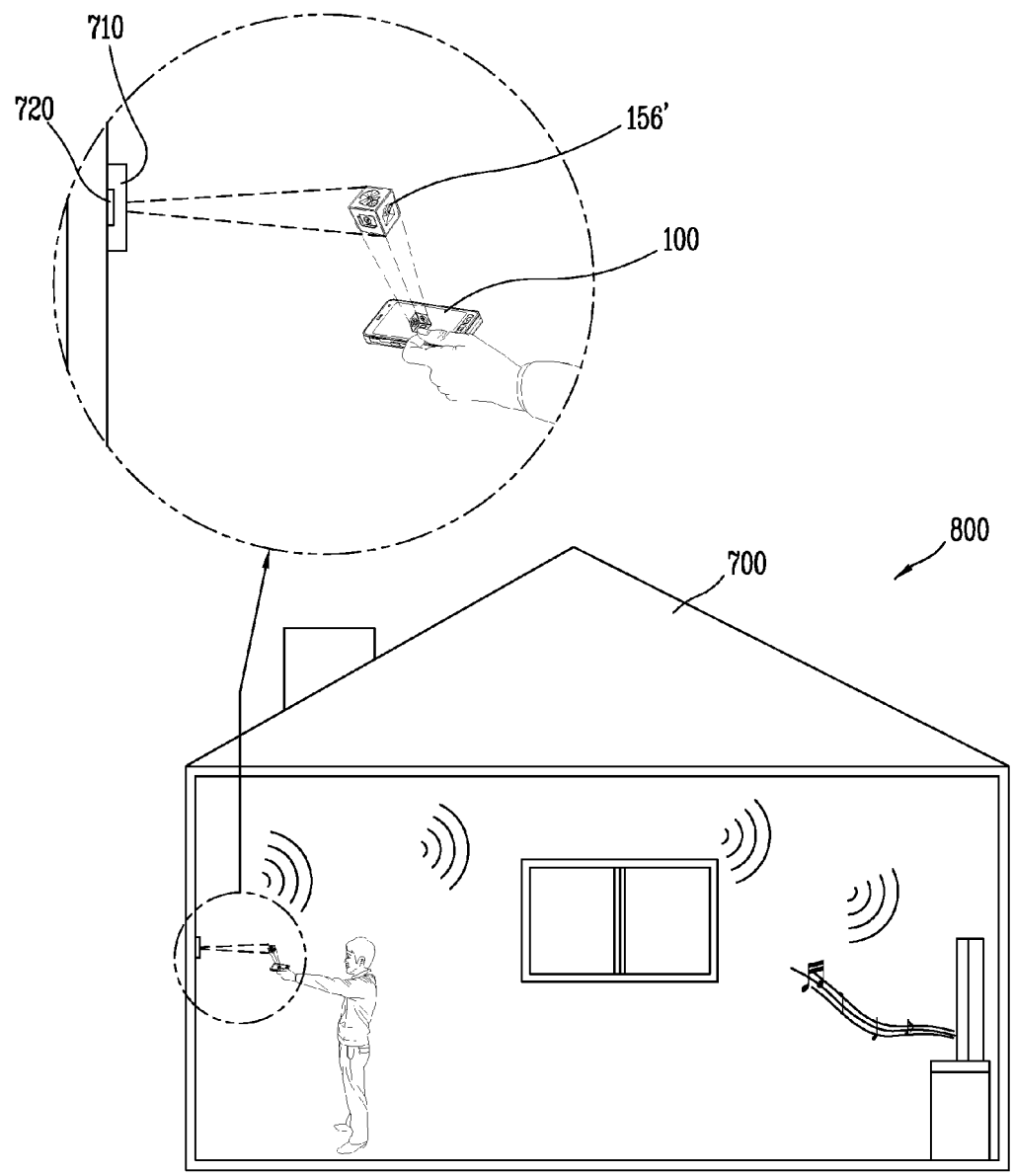
FIG. 15 is a conceptual view illustrating an ubiquitous environment using the holographic image illustrated in FIG. 2.
Figure 16:
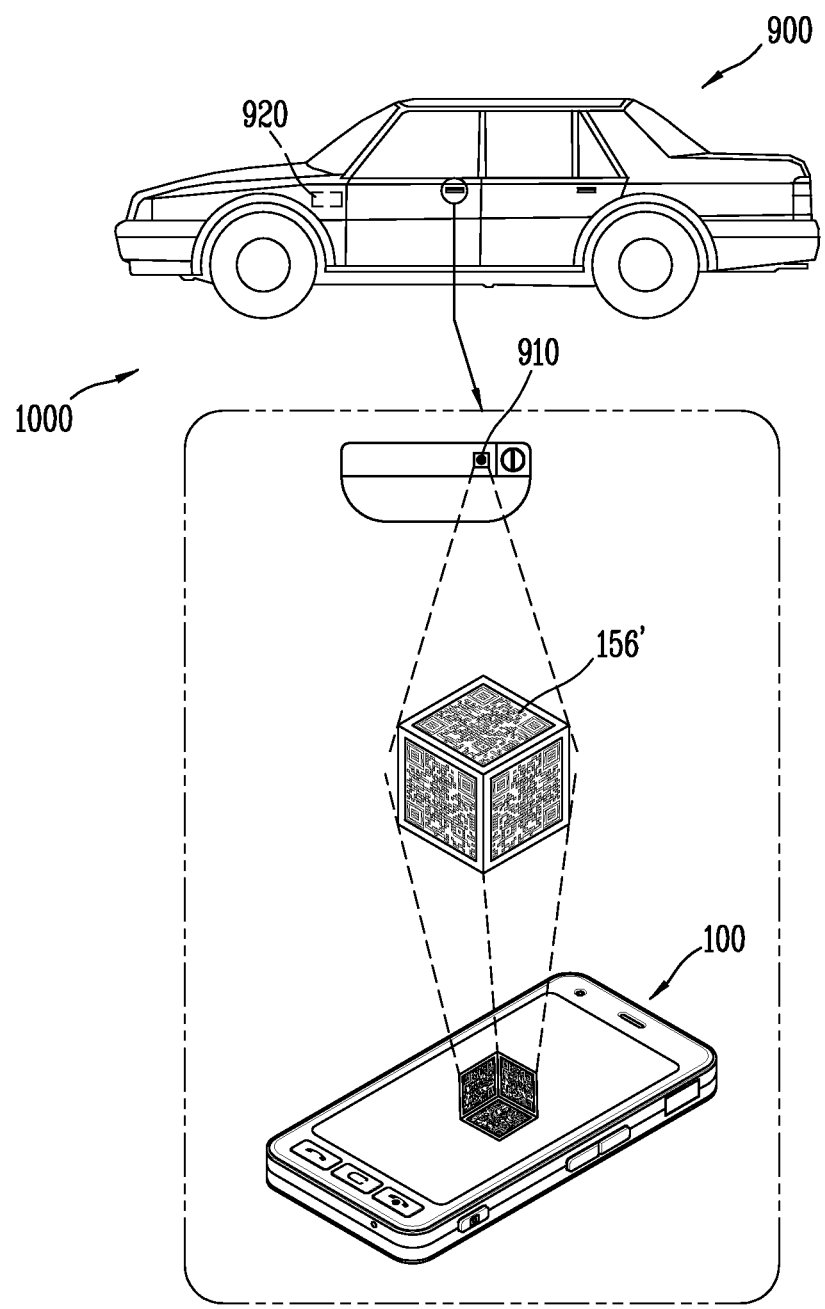
FIG. 16 is a conceptual view illustrating an example of using the holographic image of FIG. 2 as authentication means.

FIG. 15 is a conceptual view illustrating an ubiquitous environment using the holographic image 156' illustrated in FIG. 2, and FIG. 16 is a conceptual view illustrating an example of using the holographic image 156' of FIG. 2 as authentication means.

As illustrated in FIGS. 15 and 16, a holography control system 800, 1000 may include a mobile terminal 100 and a target apparatus 700, 900. The mobile terminal 100 may include a holography module 156. The holography module 156 may output a holographic image 156' to a preset space. The target apparatus 700, 900 may be controlled by the holographic image 156'.

In detail, the target apparatus 700, 900 may include a sensing unit 710, 910 and a controller 720, 920.

The sensing unit 710, 910 may sense the holographic image 156'. The sensing unit 710, 910 may directly sense the holographic image 156' or capture the holographic image 156' and sense the holographic image 156' based on the captured image. The controller 720, 920 may analyze the holographic image 156' sensed by the sensing unit 710, 910, so as to generate a corresponding operation command.

Referring to FIG. 15, if a user outputs the holographic image 156' associated with a music in a building in which a ubiquitous environment as one example of the target apparatus 700 is constructed, the controller 720 may analyze the holographic image 156' sensed by the sensing unit 710 such that the music can be played from an audio. This may be utilized in various control methods, such as blackout, elevator call, and the like.

Referring to FIG. 16, the holographic image 156' may include 3D information which is implemented as a 3D image. The controller 920 may execute authentication for the operation command using the 3D information sensed by the sensing unit 910.

For example, when the holographic image 156' is projected toward the sensing unit 910 which is installed at a handle of a vehicle, which is another example of the target apparatus 900, the sensing unit 910 may sense the holographic image 156', and the controller 920 may open a door of the vehicle. Here, prior to opening the door of the vehicle, the controller 920 may undergo a process of checking whether or not the 3D information represented as the holographic image 156' is authenticated 3D information. That is, the holographic image 156' may be utilized as the authentication means so as to replace a key of the vehicle.

In such a manner, the 3D information formed by the holographic image 156' may dramatically increase a quantity of recordable information, as compared with barcodes having information merely in one direction, and QR codes having information in horizontal and vertical directions. In addition, the 3D information may be created into a lot of combinations (sets), so as to be appropriately utilized as means for authentication.

The holographic image 156' used for the authentication may be configured to be output only after carrying out a separate authentication procedure (for example, password input, etc.) through the mobile terminal 100. Or, the target apparatus 900 may execute a first authentication with an authentication module, such as SIM, UIM, USIM and the like, through communication with the mobile terminal 100, and thereafter execute a second authentication using the holographic image 156'.

With the configuration, the target apparatus 900 may sense and analyze the holographic image 156' output from the mobile terminal 100 to transmit a corresponding operation command. This may result in using the holographic image 156' as the means for authentication, construction of ubiquitous environment and the like.

Hereinafter, another exemplary embodiment disclosed herein will be described. The following description will provide the same/like reference numerals to the same/like components to the previous embodiments, and description thereof will not be repeated.

Figure 17:
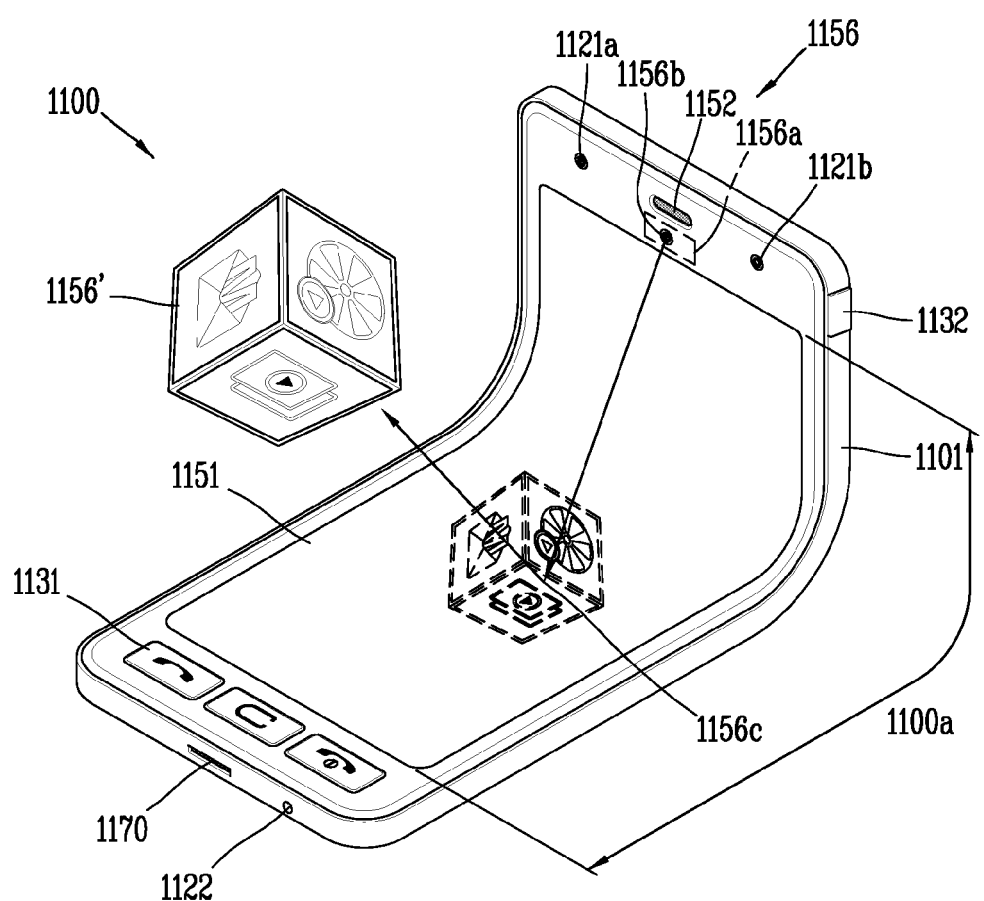
FIG. 17 is a conceptual view illustrating another exemplary embodiment of a mobile terminal disclosed herein, namely, an example with a holographic image realized thereon.

FIG. 17 is a conceptual view illustrating another exemplary embodiment of a mobile terminal 1100 disclosed herein, namely, an example with a holographic image 1156' realized thereon.

As illustrated in FIG. 17, a terminal body may include a flexible unit 1100a which forms at least one area thereof and is elastically deformable. The flexible unit 1100a may be made of an elastically deformable material, for example, silicon, urethane, cellulose and the like.

The flexible unit 1100a may include a flexible display module 1151, such as a flexible LCD, a flexible OLED and the like. The display module 1151 may be elastically deformable, and may not cause an image loss even by the elastic deformation.

The flexible unit 1100a may be curved or bent to form the terminal body into a circular or angular shape, or rolled or unfolded from the terminal body to be open to the outside. The flexible unit 1100a may be elastically deformed by an externally transferred force or by an electromagnetic force, which is applied in response to a manipulation of the mobile terminal 1100. The deformed flexible unit 1100a may remain deformed or return to its original state. The deformation and return of the flexible unit 1100a may be automatically enabled according to settings of the mobile terminal 1100.

The drawing exemplarily illustrates that the flexible unit 1100a occupies a considerable portion of the terminal body except for both end portions thereof, and the display unit 1151 may be provided on the considerable portion to be freely deformable.

The terminal body may be provided with a holography module 1156 so as to output a holographic image 1156' on a preset space when the flexible unit 1100a is elastically deformed. This drawing exemplarily illustrates that the holography module 1156 is mounted on a bezel portion which surrounds the display unit 1151.

The preset space may be decided based on an arrangement of the holography module 1156, and an attribute of the holographic image 1156' [for example, size, orientation and the like of the holographic image 1156']. The preset space, for example, may be limited to an inner space of a virtual sphere/hemisphere having a specific radius based on a holographic reflection unit 1156c to be explained later. The holographic image 1156' may be output to a space, irrelevant to an installed direction of the holography module 156, in response to the elastic deformation of the flexible unit 1100a, by the holographic reflection unit 1156c, or the like.

The holography module 1156 may include a holographic storage unit 1156a, a holographic output unit 1156b and a holographic reflection unit 1156c, and be configured to output the holographic image 1156' on the preset space.

Hereinafter, for the sake of explanation, the following embodiment illustrates that the holographic storage unit 1156a, the holographic output unit 1156b and the holographic reflection unit 1156c are included in the holography module 1156. However, the embodiment is merely illustrative. Those components may also be included in the mobile terminal 1100 as separate components. Especially, the holographic reflection unit 1156c may be a separate component for turning an output direction of the holographic image 1156', and may be disposed to be spaced apart from the holographic storage unit 1156a and the holographic output unit 1156b.

The holographic storage unit 1156a may include a holographic storage medium for recording interference fringes generated due to interference between irradiated object waves and reference waves. The holographic storage medium may be made of a material, such as photopolymer, which gives rise to a change in response to light.

The holographic output unit 1156b may irradiate reconstruction waves which are the same as reference waves to the holographic storage unit 1156a (in detail, the holographic storage medium). The holographic output unit 1156b may then output the holographic image 1156', which is generated in a manner that the irradiated reconstruction waves are diffracted due to the interference fringes recorded in the holographic storage medium.

The generated holographic image 1156' may be projected to the holographic reflection unit 1156c. The holographic reflection unit 1156c may then turn the output direction of the holographic image 1156' such that the generated holographic image 1156' can be output to the preset space.

The drawings illustrate that the holographic output unit 1156b is disposed adjacent to the bezel portion surrounding the display unit 1151, in detail, to an audio output module 1152, and the holographic reflection unit 1156c is disposed on the display unit 1151. The holographic reflection unit 1156c may be a reflection sheet which forms one layer of the display unit 1151 and has high reflectivity to reflect incident light.

As illustrated, the flexible unit 1100a may be configured such that the holographic output unit 1156b can be elastically deformed to face the holographic reflection unit 1156c. For example, when the mobile terminal 1100 receives a command indicating an entrance into a projection mode of the holographic image 1156' through a user input unit 1130, the flexible unit 1100a may be curved by an electromagnetic force such that the holographic output unit 1156b can project the generated holographic image 1156' to the holographic reflection unit 1156c.

A controller 1180 may analyze setting values of focal distance, size and the like of the holographic image 1156' so as to adjust an elastically-deformed degree of the flexible unit 1100a. Accordingly, a distance, an angle and the like between the holographic output unit 1156b and the holographic reflection unit 156c may be adjusted.

Also, a controller 1180 may analyze an error due to the elastic deformation of the flexible unit 1100a, for example, the distance, the angle and the like between the holographic output unit 1156b and the holographic reflection unit 156c, so as to adjust the settings of the holographic output unit 1156b.

This may result in correction of a mechanical error due to the elastic deformation of the flexible unit 1100a, and an error due to the change of relative position information between the holographic output unit 1156b and the holographic reflection unit 156c, thereby realizing the more clear holographic image 1156'.

The controller 1180 may also analyze an error due to the change of external environments, to adjust the settings of the holographic output unit 1156b. For example, if ambient brightness is changed or vibration is sensed by a sensing unit 1140, the settings of the holographic output unit 1156b may be adjusted in response to the change or sensing, and accordingly the clear holographic image 1156' can be output.

With the configuration disclosed herein, the holography module 1156 may be configured such that the holographic image 1156' can be output on the preset space when the flexible unit 1100a forming the at least one area of the terminal body is elastically deformed. This may allow for implementing more various user interfaces, using the flexible unit 1100a, the holography module 1156 and the holographic image 1156'.

The flexible unit 1100a may be curved toward a user so as to serve as a shielding layer which shields all or part of the surrounding, thereby allowing the holographic image 1156' to be provided more clearly and preventing the holographic image 1156' from being exposed to others. The controller 1180 may change settings in relation to the curving or bending of the flexible unit 1100a according to a private/public use or each content.

Figure 18:
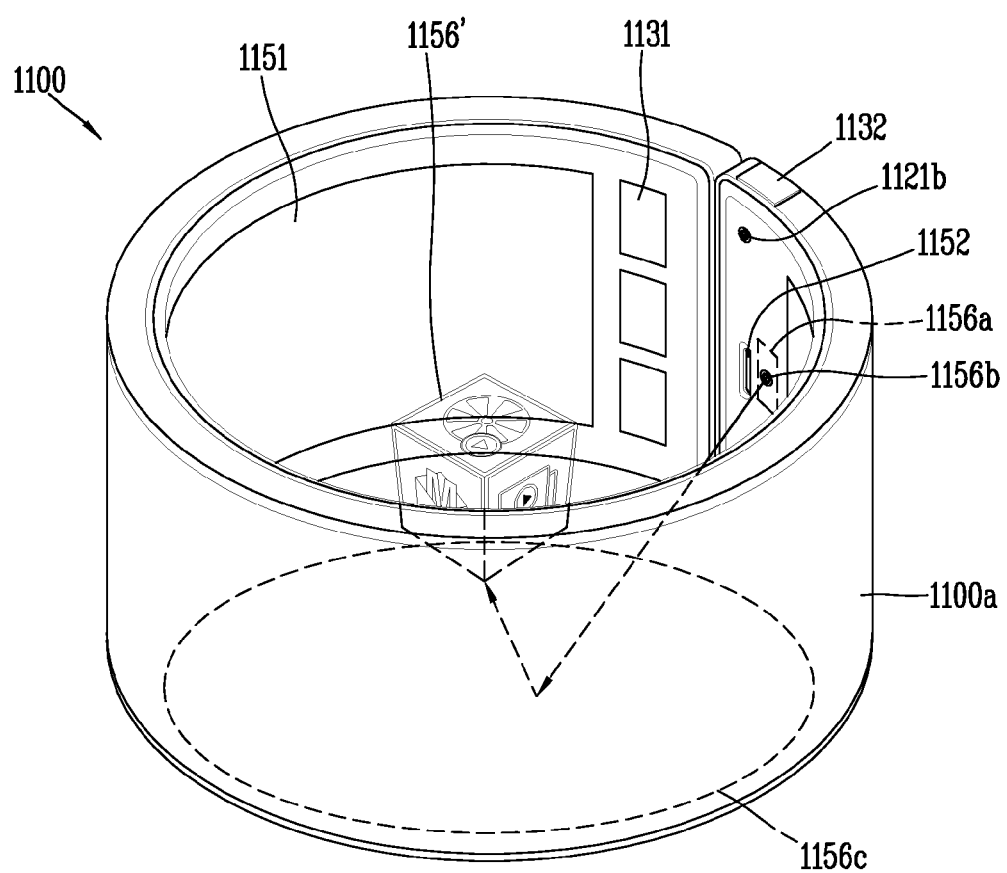
FIG. 18 is a conceptual view illustrating another exemplary embodiment that a holography module of FIG. 17 outputs a holographic image.
Figure 19:
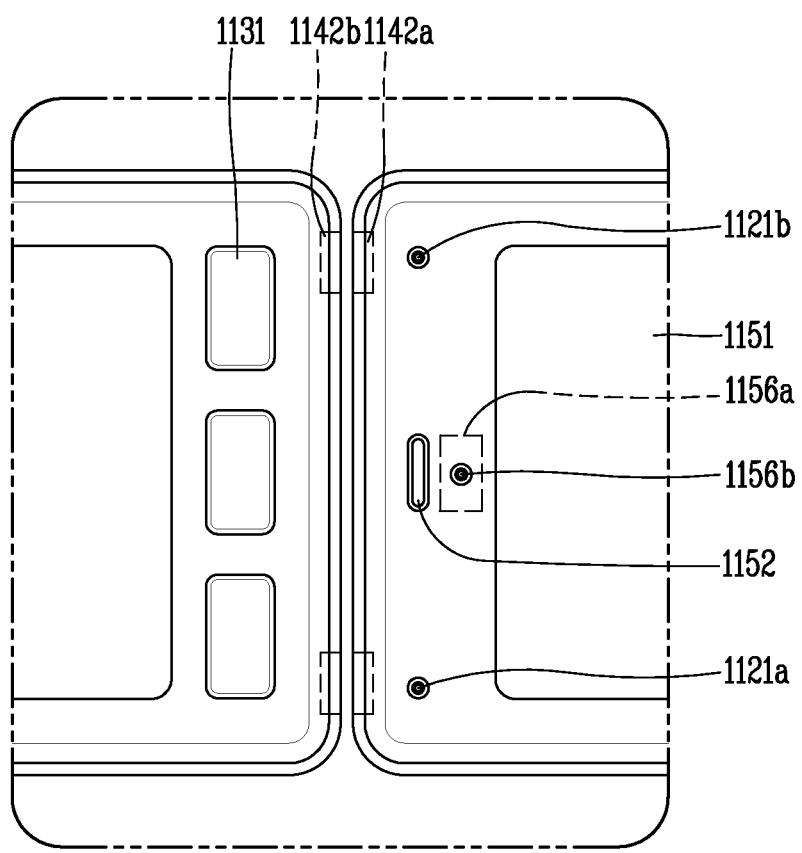
FIG. 19 is an enlarged view illustrating connected portions of both ends of the mobile terminal illustrated in FIG. 18.

FIG. 18 is a conceptual view illustrating another exemplary embodiment that the holography module 1156 of FIG. 17 outputs the holographic image 1156', and FIG. 19 is an enlarged view illustrating a connected portion of both ends of the mobile terminal 1100 illustrated in FIG. 18.

As illustrated in FIG. 18, the terminal body may form a loop in a manner that the flexible unit 1100a is elastically deformed. For example, the terminal body may be rolled into a cylindrical shape or curved into an angular shape, such that one end portion and the other end portion along a lengthwise direction thereof come in contact with each other.

The holography module 1156 may output the holographic image 1156' within an inner space formed by the loop. The holographic image 1156' may be visible only through openings at both sides, with being invisible from other external spaces. Therefore, this structure can be utilized for a user interface with more intensified privacy.

The holographic reflection unit 1156c may be arranged to cover one of the openings, formed by the loop, such that the holographic image 1156' can be reflected thereby so as to be exposed through the other opening. The holographic reflection unit 1156c may be normally located in the terminal body. Then, when the terminal body forms the loop, the holographic reflection unit 1156c may be automatically popped up from the inside to cover the one opening.

The holographic output unit 1156b may project the generated holographic image 1156' toward the one opening, namely, the holographic reflection unit 1156c, and the holographic reflection unit 1156c may turn the output direction toward the other opening such that the generated holographic image 1156' can be output to a preset space. The preset space may be limited to the inner space formed by the loop. This may allow the holographic image 1156' to be visible only through the other opening, thereby protecting a user's privacy.

As illustrated in FIG. 19, the mobile terminal 1100 may include a first sensing unit 1142a and a second sensing unit 1142b which sense each other to check whether or not the terminal body forms the loop. The first sensing unit 1142a may be mounted on one end portion of the terminal body in a lengthwise direction of the terminal body, and the second sensing unit 1142b may be installed on the other end portion to sense the first sensing unit 1142a when the terminal body forms the loop.

The first and second sensing units 1142a and 1142b may operate the sensing in a contact or non-contact manner using hooks, electromagnets, sensors and the like. The controller 1180 may control the projection mode of the holographic image 1156' to be activated when the formation of the loop by the terminal body is sensed by the first and second sensing units 1142a and 1142b.

In detail, the holography module 1156 may output the holographic image 1156' when the second sensing unit 1142b senses the first sensing unit 1142a. Also, the holographic reflection unit 1156c covers the one opening such that the holographic image 1156' can be output through the other opening when the second sensing unit 1142b senses the first sensing unit 1142a.

Figure 20:
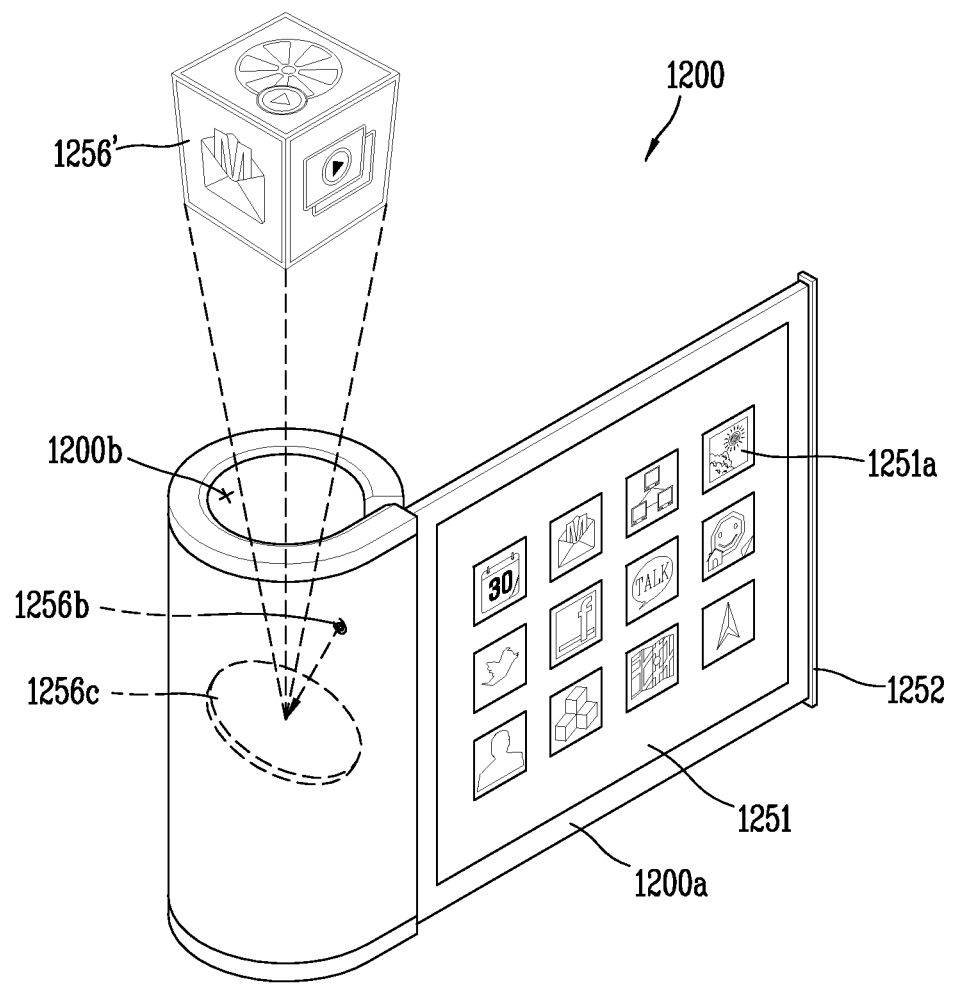
FIG. 20 is a conceptual view illustrating another exemplary embodiment of a mobile terminal disclosed herein, namely, an example with a holographic image realized thereon.

FIG. 20 is a conceptual view illustrating another exemplary embodiment of a mobile terminal 1200 disclosed herein, namely, an example with a holographic image 1256' realized thereon.

As illustrated in FIG. 20, a flexible unit 1200a may be rolled or unfolded from a terminal body to be open to the outside. This drawing illustrates a state that the flexible unit 1200a having a display unit 1251 is selectively unrolled while the flexible unit 1200a is rolled along with the terminal body, which is rolled into a cylindrical shape, such that part or all of the display unit 1251 is exposed. An application execution icon 1251a and the like may be output on the display unit 1251.

A protrusion 1252 may be formed on one end of the flexible unit 1200a. If a user grabs the protrusion 1252 and pulls the flexible unit 1200a from the terminal body, the display unit 1251 may be externally exposed. When the display unit 1251 is fully unrolled, it may be mechanically locked (hooked, stopped) so as to maintain the unrolled state. When the display unit 1251 is not fully unrolled, it may be accommodated back into the terminal body by an elastic member (not illustrated). Here, the protrusion 1252 may be formed to be locked (hooked, stopped) at the terminal body, so as to prevent the display unit 1251 from being completely rolled into the terminal body due to the elastic member.

A holography module 1256 may output a holographic image 1256' when the flexible unit 1200a is unrolled by more than a preset area. For example, a controller 1280 may control the holography module 1256 to enter a projection mode of the holographic image 1256' only when the flexible unit 1200a is completely unrolled such that the entire display unit 1251 is fully exposed. Therefore, if an exposed degree of the display unit 1251 is less than a reference [this drawing has the condition that the display unit 1251 is entirely exposed], the controller 1280 may enable an error handling such that the holography module 1256 does not output the holographic image 1256'.

The terminal body rolled into the cylindrical shape may form a hollow portion 1200b. When the entire display unit 1251 is exposed, a holographic reflection unit 1256c may be popped out to form a bottom surface of the hollow portion 1200b. A holographic output unit 1256b may project the generated holographic image 1256' toward the holographic reflection unit 1256c. The holographic reflection unit 1256c may then turn an output direction of the holographic image 1256' such that the holographic image 1256' can be output within a preset space on the hollow portion 1200b.

As similar to the structure illustrated in FIG. 16, if the holographic image 1256' output from the mobile terminal 1200 is used as authentication means, the flexible unit 1200a may be curved toward a sensing unit 910 so as to serve as a shielding layer which shields all or part of the surrounding, thereby preventing the holographic image 1256' from being exposed to others.

The aforementioned mobile terminal and the holography control system having the same disclosed herein may not be limited to the configuration and method of the foregoing embodiments. All or part of those exemplary embodiments may be selectively combined such that various modifications or variations can be obtained from the exemplary embodiments.

The exemplary embodiments disclosed herein propose a method of representing a hologram image in a mobile terminal so as to be applied to various related industrial fields.

The invention claimed is:

1. A mobile terminal comprising:
a terminal body;
a holography module mounted to the terminal body and configured to output a holographic image to a preset space;
a first camera module disposed to face the preset space and configured to capture the holographic image; and
a flexible unit configured to form at least one area of the terminal body and be elastically deformable,
wherein the holography module outputs the holographic image to the preset space when the flexible unit is elastically deformed, and
wherein the holography module comprises:
a holographic storage unit configured to record interference fringes generated due to light interference;
a holographic output unit configured to irradiate light to the holographic storage unit to be diffracted with the interference fringes, so as to generate the holographic image; and
a holographic reflection unit configured to turn an output direction of the holographic image such that the holographic image is output to the preset space; and
a controller configured to analyze an error due to the elastic deformation of the flexible unit or a change of an external environment, and adjust settings of the holographic output unit.

2. The terminal of claim 1, wherein the first camera module focuses on the preset space.

3. The terminal of claim 1, further comprising a second camera module spaced apart from the first camera module by a preset distance and disposed to face the preset space, to capture the holographic image in a three-dimensional form together with the first camera module.

4. The terminal of claim 3, further comprising a third camera module mounted to the terminal body, and configured to capture a portion except for the preset space when the first camera module captures the holographic image.

5. The terminal of claim 1, further comprising a flash disposed to face the preset space to illuminate the holographic image.

6. The terminal of claim 1, wherein the flexible unit is elastically deformable such that the holographic output unit faces the holographic reflection unit.

7. The terminal of claim 1, wherein the terminal body is configured to form a loop in a manner that the flexible unit is elastically deformed, and wherein the holography module outputs the holographic image to an inner space formed by the loop.

8. The terminal of claim 7, wherein the holographic reflection unit is disposed to cover one of openings, formed by the loop, such that the holographic image is reflected to be exposed through the other opening.

9. The terminal of claim 7, further comprising:
a first sensing unit mounted to one end portion of the terminal body; and
a second sensing unit mounted to the other end portion of the terminal body and configured to sense the first sensing unit when the terminal body forms the loop.

10. The terminal of claim 9, wherein the holography module outputs the holographic image when the second sensing unit senses the first sensing unit.

11. The terminal of claim 9, wherein the holographic reflection unit is disposed to cover the one opening when the second sensing unit senses the first sensing unit.

12. A mobile terminal comprising:
a terminal body;
a holography module mounted to the terminal body and configured to output a holographic image to a preset space;
a first camera module disposed to face the preset space and configured to capture the holographic image; and
a flexible unit configured to form at least one area of the terminal body and be elastically deformable,
wherein the holography module outputs the holographic image to the preset space when the flexible unit is elastically deformed,
wherein the flexible unit is configured to be unrolled to the outside of the terminal body, and
wherein the holography module outputs the holographic image when the flexible unit is unrolled by more than a preset area.

13. A holography control system comprising:
a mobile terminal having a holography module formed to output a holographic image to a preset space, and configured to transmit a packet including position information related to a terminal body and attribute information related to the holographic image; and
a target apparatus configured to execute communication with the mobile terminal,
wherein the target apparatus comprises:
a wireless communication unit configured to receive the packet; and
a capturing unit configured to capture the holographic image using the received packet, and
wherein the capturing, unit is moved to face the preset space using the packet.

14. The system of claim 13, wherein the capturing unit is configured to focus on the preset space.

15. The system of claim 13, wherein the wireless communication unit transmits the holographic image captured by the capturing unit to a server.

16. The system of claim 13, wherein the wireless communication unit transmits relative position information with the mobile terminal obtained based on the received packet, to the mobile terminal, and wherein the holography module may adjust a projection direction of the holographic image based on the relative position information.

17. The system of claim 13, wherein the mobile terminal further comprises a flash disposed to face the preset space to illuminate the holographic image.

18. The system of claim 13, wherein the target apparatus further comprises a controller configured to analyze the holographic image captured by the capturing unit to generate a corresponding operation command.

* * * * *